(12) United States Patent
Ferguson et al.

(10) Patent No.: US 12,524,119 B1
(45) Date of Patent: Jan. 13, 2026

(54) USER IDENTIFICATION WITH A CAPACITANCE MODULE

(71) Applicant: Cirque Corporation, Sandy, UT (US)

(72) Inventors: Daniel Ferguson, Herriman, UT (US); Ethan Sturm, Salt Lake City, UT (US); Brian Monson, Farmington, UT (US)

(73) Assignee: Cirque Corporation, Sandy, UT (US)

( * ) Notice: Subject to any disclaimer, the term of this patent is extended or adjusted under 35 U.S.C. 154(b) by 0 days.

(21) Appl. No.: 18/947,662

(22) Filed: Nov. 14, 2024

Related U.S. Application Data

(63) Continuation-in-part of application No. 18/883,887, filed on Sep. 12, 2024, now Pat. No. 12,443,314, which is a continuation of application No. 18/809,924, filed on Aug. 20, 2024, now Pat. No. 12,422,960.

(51) Int. Cl.
*G06F 3/044* (2006.01)
*G06F 3/041* (2006.01)

(52) U.S. Cl.
CPC ........ *G06F 3/0443* (2019.05); *G06F 3/04166* (2019.05)

(58) Field of Classification Search
None
See application file for complete search history.

(56) References Cited

U.S. PATENT DOCUMENTS

| | | |
|---|---|---|
| 8,604,364 B2 | 12/2013 | Simon |
| 9,430,147 B2 | 8/2016 | Luo |
| 11,449,123 B2 | 9/2022 | Li |
| 11,836,317 B2 | 12/2023 | Yang |
| 2013/0201155 A1 | 8/2013 | Wu |
| 2015/0074615 A1* | 3/2015 | Han ............... H04L 63/105 715/863 |
| 2023/0110133 A1 | 4/2023 | Dhar |

* cited by examiner

*Primary Examiner* — Duane N Taylor, Jr.

(57) ABSTRACT

A capacitance module may include a set of electrodes, a processor in communication with the set of electrodes, and memory in communication with the processor. The memory may include programmed instructions that cause the capacitance module, when executed, to determine a user identity by comparing input attributes of an unprompted input with at least one user attribute stored in the memory.

20 Claims, 28 Drawing Sheets

USER IDENTIFICATION WITH A CAPACITANCE MODULE

CROSS REFERENCE TO RELATED APPLICATIONS

This application is a continuation-in-part of U.S. patent application Ser. No. 18/883,887 titled Response to a Typing Input and filed on Sep. 12, 2024. U.S. patent application Ser. No. 18/883,887 is a continuation-in-part of U.S. patent application Ser. No. 18/809,924 titled Determining an Unprompted Input filed on Aug. 20, 2024. U.S. patent application Ser. No. 18/809,924 is herein incorporated by reference for all that it discloses.

FIELD OF THE DISCLOSURE

This disclosure relates generally to systems and methods for capacitive trackpads. In particular, this disclosure relates to systems and methods for user identification through capacitive trackpads.

BACKGROUND

User identification is an increasingly important aspect of modern computing. As computer devices become more personal and shared between multiple users, the ability to quickly and accurately identify which user is interacting with a particular devices becomes more critical. Traditional methods of user identification, such as login screens or passwords, can be cumbersome and time-consuming, detracting from the overall user experience and efficiency of interaction. Current solutions for user identification on computing devices often rely on explicit authentication methods, such as entering usernames and passwords, using biometric scanners (e.g., fingerprint or facial recognition), or authentication cards.

An example of an authentication method is disclosed in U.S. Pat. No. 8,739,266 issued to Mark Buer. This reference discloses a universal authentication token that is configured to securely acquire security credentials from other authentication tokens and/or devices. In this manner, a single universal authentication token can store the authentication credentials required to access a variety of resources, services, and applications for a user. The universal authentication token includes a user interface, memory for storing a plurality of authentication records for a user, and a secure processor. The secure processor provides the required cryptographic operations to encrypt, decrypt, and/or authenticate data that is sent or received by universal token. For example, secure processor may be used to generate authentication data from seed information stored in memory.

An example of human verification with a capacitance module is disclosed in U.S. Patent Publication No. 2024/0069624 issued to Tyler Smith. This reference discloses telling a human apart from a computer by using a capacitance module may include receiving a request for human verification, determining a human-verification prompt, communicating the human-verification prompt using a prompting device in the capacitance module, detecting a response to the human-verification prompt using a user input sensor in the capacitance module, determining whether a human is operating the capacitance module based, in part, on the response detected with the user input detector, and returning a human verification result.

Each of these references are herein incorporated by reference for all that they disclose.

SUMMARY

In one embodiment, a capacitance module may include a set of electrodes, a processor in communication with the set of electrodes, and memory in communication with the processor. The memory may include programmed instructions that cause the capacitance module, when executed, to determine a user identity by comparing input attributes of an unprompted input with at least one user attribute stored in the memory.

The stored attribute may include a speed attribute.

The stored attribute may include a movement attribute.

The stored attribute may include a gesture endpoint attribute.

The stored attribute may include a pressure attribute.

The stored attribute may include a capacitance attribute.

The stored attribute may include a multi-touch attribute.

The stored attribute may include a typing attribute.

The programmed instructions may further cause the processor to create a user profile and associate the stored attribute with the user profile.

The user profile may be created through a machine learning process.

The stored user attribute may be determined through a calibration process.

The stored user attribute may be updated through a machine learning process.

The programmed instructions may cause the processor to receive a user identity request associated with an unprompted input, determine a user identity for the unprompted input by consulting the stored user attribute, and authenticate the user identity request if the determined user identity matches the user identity request.

Authenticating the user identity request may include granting access to a restricted function or data.

In another embodiment, a method for determining an identity of a user may include determining a user identity by comparing input attributes of an unprompted input measured with a capacitance module to at least one stored user attribute.

The method may further include creating a user profile associated with an electric device associated with the capacitance module and associating the stored attribute with the user profile.

In another embodiment, a computer-program product for identifying a user of a capacitance module may include a non-transitory computer-readable medium which stores instructions executable by a processor to determine a user identity by comparing input attributes of an unprompted input measured with a capacitance module to at least one stored user attribute.

The medium may include further instructions executable by a processor to create a user profile associated with an electric device associated with the capacitance module and associate the stored attribute with the user profile.

The medium may include further instructions executable by a processor to authenticate a user identity request based, at least in part, on the user identity.

The medium may include further instructions executable by a processor to grant access to a restricted function or data.

Figure 1:
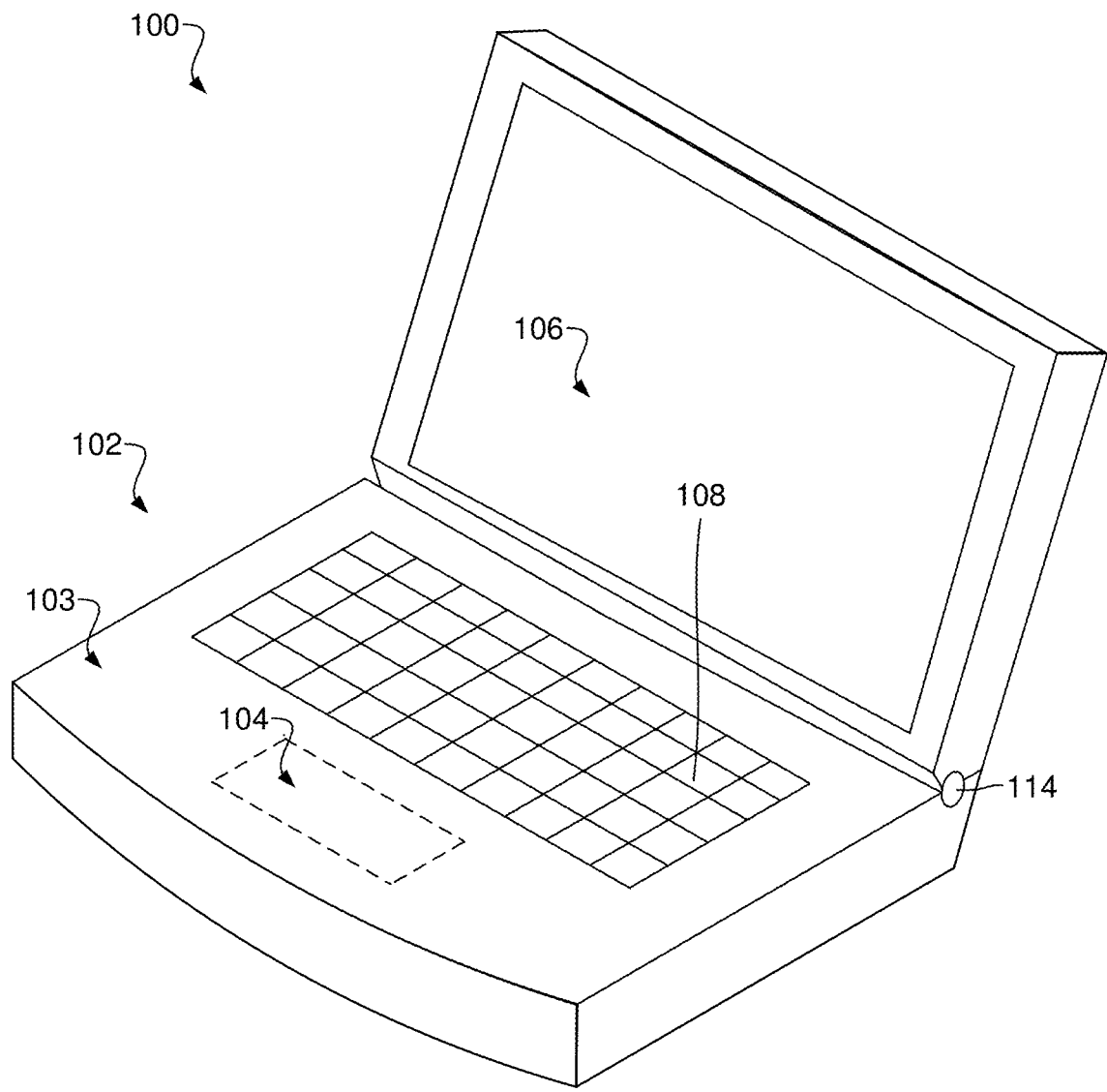
FIG. 1 depicts an example of an electronic device in accordance with the disclosure.

While the disclosure is susceptible to various modifications and alternative forms, specific embodiments have been shown by way of example in the drawings and will be described in detail herein. However, it should be understood that the disclosure is not intended to be limited to the particular forms disclosed. Rather, the intention is to cover all modifications, equivalents and alternatives falling within the spirit and scope of the invention as defined by the appended claims.

DETAILED DESCRIPTION OF THE INVENTION

This description provides examples, and is not intended to limit the scope, applicability, or configuration of the invention. Rather, the ensuing description will provide those skilled in the art with an enabling description for implementing embodiments of the invention. Various changes may be made in the function and arrangement of elements.

Thus, various embodiments may omit, substitute, or add various procedures or components as appropriate. For instance, it should be appreciated that the methods may be performed in an order different than that described, and that various steps may be added, omitted, or combined. Also, aspects and elements described with respect to certain embodiments may be combined in various other embodiments. It should also be appreciated that the following systems, methods, devices, and software may individually or collectively be components of a larger system, wherein other procedures may take precedence over or otherwise modify their application.

For purposes of this disclosure, the term "aligned" generally refers to being parallel, substantially parallel, or forming an angle of less than 35.0 degrees. For purposes of this disclosure, the term "transverse" generally refers to perpendicular, substantially perpendicular, or forming an angle between 55.0 and 125.0 degrees. For purposes of this disclosure, the term "length" generally refers to the longest dimension of an object. For purposes of this disclosure, the term "width" generally refers to the dimension of an object from side to side and may refer to measuring across an object perpendicular to the object's length.

For purposes of this disclosure, the term "electrode" may generally refer to a portion of an electrical conductor intended to be used to make a measurement, and the terms "route" and "trace" generally refer to portions of an electrical conductor that are not intended to make a measurement. For purposes of this disclosure in reference to circuits, the term "line" generally refers to the combination of an electrode and a "route" or "trace" portions of the electrical conductor. For purposes of this disclosure, the term "Tx"

generally refers to a transmit line, electrode, or portions thereof, and the term "Rx" generally refers to a sense line, electrode, or portions thereof.

For the purposes of this disclosure, the term "electronic device" may generally refer to devices that can be transported and include a battery and electronic components. Examples may include a laptop, a desktop, a mobile phone, an electronic tablet, a personal digital device, a watch, a gaming controller, a gaming wearable device, a wearable device, a measurement device, an automation device, a security device, a display, a computer mouse, a vehicle, an infotainment system, an audio system, a control panel, another type of device, an athletic tracking device, a tracking device, a card reader, a purchasing station, a kiosk, or combinations thereof.

It should be understood that use of the terms "capacitance module," "touch pad" and "touch sensor" throughout this document may be used interchangeably with "capacitive touch sensor," "capacitive sensor," "capacitance sensor," "capacitive touch and proximity sensor," "proximity sensor," "touch and proximity sensor," "touch panel," "trackpad," "touch pad," and "touch screen." The capacitance module may be incorporated into an electronic device.

It should also be understood that, as used herein, the terms "vertical," "horizontal," "lateral," "upper," "lower," "left," "right," "inner," "outer," etc., can refer to relative directions or positions of features in the disclosed devices and/or assemblies shown in the Figures. For example, "upper" or "uppermost" can refer to a feature positioned closer to the top of a page than another feature. These terms, however, should be construed broadly to include devices and/or assemblies having other orientations, such as inverted or inclined orientations where top/bottom, over/under, above/below, up/down, and left/right can be interchanged depending on the orientation.

In some cases, the capacitance module is located within a housing. The capacitance module may be underneath the housing and capable of detecting objects outside of the housing. In examples, where the capacitance module can detect changes in capacitance through a housing, the housing is a capacitance reference surface. For example, the capacitance module may be disclosed within a cavity formed by a keyboard housing of a computer, such as a laptop or other type of computing device, and the sensor may be disposed underneath a surface of the keyboard housing. In such an example, the keyboard housing adjacent to the capacitance module is the capacitance reference surface. In some examples, an opening may be formed in the housing, and an overlay may be positioned within the opening. In this example, the overlay is the capacitance reference surface. In such an example, the capacitance module may be positioned adjacent to a backside of the overlay, and the capacitance module may sense the presence of the object through the thickness of the overlay. For the purposes of this disclosure, the term "reference surface" may generally refer to a surface through which a pressure sensor, a capacitance sensor, or another type of sensor is positioned to sense a pressure, a presence, a position, a touch, a proximity, a capacitance, a magnetic property, an electric property, another type of property, or another characteristic, or combinations thereof that indicates an input. For example, the reference surface may be a housing, an overlay, or another type of surface through which the input is sensed. In some examples, the reference surface has no moving parts. In some examples, the reference surface may be made of any appropriate type of material, including, but not limited to, plastics, glass, a dielectric material, a metal, another type of material, or combinations thereof.

For the purposes of this disclosure, the term "display" may generally refer to a display or screen that is not depicted in the same area as the capacitive reference surface. In some cases, the display is incorporated into a laptop where a keyboard is located between the display and the capacitive reference surface. In some examples where the capacitive reference surface is incorporated into a laptop, the capacitive reference surface may be part of a touch pad. Pressure sensors may be integrated into the stack making up the capacitance module. However, in some cases, the pressure sensors may be located at another part of the laptop, such as under the keyboard housing, but outside of the area used to sense touch inputs, on the side of the laptop, above the keyboard, to the side of the keyboard, at another location on the laptop, or at another location. In examples where these principles are integrated into a laptop, the display may be pivotally connected to the keyboard housing. The display may be a digital screen, a touch screen, another type of screen, or combinations thereof. In some cases, the display is located on the same device as the capacitive reference surface, and in other examples, the display is located on another device that is different from the device on which the capacitive reference surface is located. For example, the display may be projected onto a different surface, such as a wall or projector screen. In some examples, the reference surface may be located on an input or gaming controller, and the display is located on a wearable device, such as a virtual reality or augmented reality screen. In some cases, the reference surface and the display are located on the same surface, but on separate locations on that surface. In other examples, the reference surface and the display may be integrated into the same device, but on different surfaces. In some cases, the reference surface and the display may be oriented at different angular orientations with respect to each other.

For the purposes of this disclosure, the term "user attribute" may generally refer to a characteristic or feature of the sensor data generated by a user's interaction with a capacitance module which may be used to uniquely identify that user. These attributes capture the distinctive patterns, habits, and idiosyncrasies of an individual's touch input, allowing the system to differentiate between users based on their inherent and consistent interaction style. User attributes may encompass various aspects of the touch input, such as the speed, pressure, and spatial characteristics of the user's gestures, providing a rich set of data points for user identification algorithms to analyze and compare against stored user profiles.

For the purposes of this disclosure, the term "speed attribute" may generally refer to a type of user attribute that characterizes the velocity and temporal dynamics of a user's touch input on a capacitance module. A speed attribute may capture the rate at which a user's finger or input device moves across the sensitive reference surface of a capacitance module, including metrics such as average speed, peak speed, acceleration, deceleration, and other metrics. Speed attributes may reveal distinctive patterns in how a user navigates the reference surface of a capacitance module, such as whether they tend to make quick, darting motions or slower, more deliberate movements. By analyzing speed attributes, the system may be able to differentiate between users who exhibit consistently different pacing and tempo in their interactions with a capacitance module.

For the purposes of this disclosure, the term "movement attribute" may generally refer to a movement of the object (e.g., finger, thumb, palm, stylus, etc.) being measured. In some examples, a dimension attribute may include a distance traveled by the object, a rotation of the object, an angular distance of the object rotated, a nutation of the object, a movement direction of the object, a pattern of movement of the object, a speed of movement of the object, an initial speed of movement of the object, a continuing speed (i.e., a speed after the initial speed) of the object, a scrolling pattern of the object, a duration of movement of the object, a number of cycles of movement of the object within a predetermined time period, a swiping stroke distance, a swiping speed, a swiping angle, a number of swipes, a swiping rotation, a wiggle of the object, a wiggle variation in the object, a stability of the object, a static position of the object, a duration of a static position of the object, a scrolling stroke distance, a scrolling speed, a scrolling angle, a number of scrolling cycles, a scrolling rotation, a curvature of movement, a trajectory of movement, a location of the movement, a zoom stroke distance, a zoom in speed, a zoom out speed, a zoom pinch angle, a number of zoom cycles, a zoom pinch rotation, a curvature of movement of a zoom, a trajectory of a zoom movement, a location of a zoom movement, a difference in speeds between different parts of the object, a difference in angular speeds between different parts of the object, a difference in rotations between different parts of the object, a distal speed of an object, a proximal speed of an object, a rotational velocity of an object, a shape formed by movement of the object, the straightness of a line formed by the movement, a change in length of the object, a change in width of the object, a change in rotation of the object, a change in surface area of the object, a change in a dimension of the object, a change in a shape of the object, a change in a curvature of an edge of the object, a change in central axis position of the object, a change in central axis position of a feature of the object, a change in orientation of the object or feature, a frequency of change in position of the object or feature, a frequency of movement of the object or feature, a change in relative angular position of between features of the object, a change in relative angular position of between central axes of features of the object, another type of movement attribute, or combinations thereof. A movement attribute may be a finger movement attribute, a thumb movement attribute, a palm movement attribute, a stylus movement attribute, a proximity movement attribute, a differential of movement between different parts of an object, a relative movement, an absolute movement, another type of movement attribute, or combinations thereof.

For the purposes of this disclosure, the term "gesture endpoint attribute" may generally refer to a type of user attribute that focuses on the specific characteristics of how a user concludes or terminates a touch gesture on a capacitance module. A gesture endpoint attribute may capture metrics related to the final moments of a touch input, such as the deceleration rate, the abruptness of the finger lift-off, and the spatial precision of the endpoint location. Gesture endpoint attributes may reveal distinctive patterns in how a user typically ends their swipes, taps, or other touch interactions, such as whether they tend to have a crisp, decisive lift-off or a more gradual, lingering release. By analyzing gesture endpoint attributes, a system may differentiate between users based on the nuanced and consistent ways in which they complete their touch gestures.

For the purposes of this disclosure, the term "pressure attribute" may generally refer to a type of user attribute that characterizes the force and intensity applied by a user's finger or input device when interacting with a capacitance module. A pressure attribute may capture metrics such as the average pressure, peak, pressure, and pressure distribution across a reference surface. Pressure attributes may reveal distinctive patterns in how firmly or lightly a user typically presses on a reference surface, as well as how consistently they maintain that pressure throughout a gesture. Some users may have a characteristic heavy touch, while others may exhibit a softer, more delicate pressure profile. By analyzing pressure attributes, a system may differentiate between users based on their unique and habitual touch force patterns.

For the purposes of this disclosure, the term "signal attribute" may generally refer to a signal of the capacitance measurement. In some examples, a signal attribute may include a signal strength, a signal duration, a signal amplitude, noise associated with the signal, a pattern of noise accompanying the signal, an interference of the signal, an interference pattern associated with the signal, a resonance of the signal, the frequency of the signal, a polarity of the signal, a reflection of the signal, a voltage of the signal, a change in signal strength of the signal over time, a change in frequency of the signal over time, a change in amplitude of the signal over time, a change in polarity of the signal over time, another change of the signal over time, a peak of the signal, an edge of the signal, a processed signal attribute, an analog signal attribute, another signal attribute, or combinations thereof.

For the purposes of this disclosure, the term "image attribute" may generally refer to an image of the object (e.g., finger, thumb, palm, stylus, etc.) being measured. In some examples, an image attribute may include an image length, an image width, an image surface area, a distance between features of the image, an interpolation of the image, a spline of the image, a shape of the spline, a curvature of the spline, a number of knots in the spline, a relative angle between different portions of a spline, a distance between knots of a spline, an image edge attribute, a centroid of the image, a distance between an image edge and an image centroid, a change in signal strength across an image, a location of an edge, a location of a corner of an image, a length of a linear portion of an edge of the image, a location of a linear portion of the edge of the image, a symmetry of an image, an asymmetry of an image, a dimension of an asymmetry of an image, a repeated pattern in the image, a dimension of a segmentation of the image, an image outline, a portion of an image outline, a derivative of an image outline or a portion of an image outline, a number of identification of features of interest in an image, a spacing pattern of features of an image, a spacing distance of features of an image, a density of an image, another image attribute, or combinations thereof.

For the purposes of this disclosure, the term "dimension attribute" may generally refer to a dimension of the object (e.g., finger, thumb, palm, stylus, etc.) being measured. In some examples, a dimension attribute may include a length, a width, a surface area, a distance between features of the object, a diagonal measurement of an object, a diagonal measurement of a feature of an object, a curvature of an edge of the object, a length of an edge of the object, a cross section of the object, a cross section of a portion of the object, a cross section of a feature of an object, a length of a feature of an object, a length of a central axis of the object, an angular orientation of a central axis of the object, a location of a central axis of a feature of the object, an angular orientation of a feature of the object, another dimension, or combinations thereof. A feature of an object may include a protuberance of an object, a discontinuity of an object, an appendage of an object, another feature, or combinations thereof. A dimension attribute may be a finger dimension attribute, a thumb dimension attribute, a palm dimension attribute, a stylus dimension attribute, a proximity dimension attribute, another type of dimension attribute, or combinations thereof.

For the purposes of this disclosure, the term "multi-touch attribute" may generally refer to a type of user attribute that characterizes the patterns and behaviors exhibited by a user when interacting with a capacitance module using multiple points of contact simultaneously. A multi-touch attribute may capture metrics related to the coordination, synchronization, and spatial configuration of the user's inputs, such as the relative positions of the fingers, the timing of the touch events, and the gesture shapes formed by the multi-touch input. Multi-touch attributes may reveal distinctive patterns in how a user performs complex gestures like pinch-to-zoom, rotation, or multi-finger swipes, including their preferred finger spacing, the symmetry and parallelism of the touch points, and the smoothness of the coordinated movements. By analyzing multi-touch attributes, a system may differentiate between users based on their unique and consistent styles of multi-finger interaction, capturing the nuances of how they coordinate and execute complex touch gestures.

For the purposes of this disclosure, the term "typing attribute" may generally refer to a dimension attribute, a movement attribute, a signal attribute, an image attribute, a proximity attribute, processed attribute, a raw data attribute, another type of attribute, or combinations thereof. In some cases, a typing prompt may cause a user to bring his or her hands, palms, thumbs, and/or near to a capacitance sensor. In such an example, the system may recognize a combination of palm, fingers, and thumbs that may hover over a capacitance reference surface, may rest on a capacitance reference surface, may touch a capacitance reference surface, may be to the side of a capacitance reference surface, or combinations thereof. The act of typing may also cause multiple movements in the fingers, thumbs, and palms that occur at a simultaneously or during overlapping time periods. Thus, the typing attribute may include aspects of attributes from the finger, thumbs, and palms.

For the purposes of this disclosure, the term "capacitance signal strength" may generally refer to the amount of the change in mutual or self-capacitance measured by sensing electrodes when an input object is present. A finger or palm in close proximity to a capacitance module may increase the apparent capacitance seen by the electrodes of the module, with a larger contact area or closer proximity resulting in a stronger capacitance signal. The raw capacitance signal is typically processed to remove baseline offsets and noise, resulting in a signal strength that may correlate to a specific user identity. Capacitance, resistive, and/or inductive signal strength may be key user attributes used to distinguish between user identities.

For the purposes of this disclosure, the term "machine learning model" may generally refer to a computational model that can be trained to classify or predict outputs from inputs. In this context, a machine learning model may learn to classify or predict user identity based on patterns in the sensor data gathered by the capacitance module. Such machine learning models may be trained on datasets created from calibration inputs where the user identities associated with inputs are known. Some common machine learning algorithms that may be applied in this context include but are not limited to logistic regression, decision trees, random forests, neural networks, k-means models, and k-nearest-neighbor's models. The choice of machine learning model may depend on the complexity of the input patterns.

For the purposes of this disclosure, the term "finger input" may generally refer to touching a reference surface of the input device with a finger and/or hovering over the input device with a finger. Stored attributes associated with the finger attribute may include a signal strength, multiple capacitance signal strengths at select locations corresponding to a finger shape, a finger length, a finger width, multiple finger widths along the length of the finger, a finger shape, a surface area associated the finger, a finger size, another dimension of the finger shape, dimension attributes associated with the finger, movement attributes associated with a finger, signal attributes associated with a finger, image attributes associated with a finger, another attribute associated with the finger input, or combinations thereof.

For the purposes of this disclosure, the term "match" may generally refer to situations where the attribute values are exactly identical to each other or situations where the input attribute have a value that is at least similar to the store attributes. For example, the stored attributes may include a range of values and in situations where the input attribute falls within the range, the input attribute may be considered to match the stored attribute. In other examples, the stored attribute may be stored as an average value, a mean value, or another type of processed value. In such situations, the input attribute may be determined to match the stored attribute when the input attribute's value is within one percent of the stored attribute value, within two percent of the stored attribute value, within five percent of the stored attribute value, within ten percent of the stored attribute value, within 15 percent of the stored attribute value, within another predetermined percentage of the stored attribute value, within a first standard deviation of the stored attribute value, or combinations thereof. In some cases, an input attribute may match the stored attribute when the stored attribute has the closest value to the input attribute. However, in other examples, if the input attribute does not meet the criteria of any of the stored attributes, the user input may not be attributed to any user, even to that user profile who has the closest attribute values.

FIG. 1 depicts an example of an electronic device 100. In this example, the electronic device is a laptop. In the illustrated example, the electronic device 100 includes input components, such as a keyboard 102 and a capacitive module, such as a touch pad 104, that are incorporated into a housing 103. The electronic device 100 also includes a display 106. A program operated by the electronic device 100 may be depicted in the display 106 and controlled by a sequence of instructions that are provided by the user through the keyboard 102 and/or through the touch pad 104. An internal battery (not shown) may be used to power the operations of the electronic device 100.

The keyboard 102 includes an arrangement of keys 108 that can be individually selected when a user presses on a key with a sufficient force to cause the key 108 to be depressed towards a switch located underneath the keyboard 102. In response to selecting a key 108, a program may receive instructions on how to operate, such as a word processing program determining which types of words to process. A user may use the touch pad 104 to give different types of instructions to the programs operating on the computing device 100. For example, a cursor depicted in the display 106 may be controlled through the touch pad 104. A user may control the location of the cursor by sliding his or her hand along the surface of the touch pad 104. In some cases, the user may move the cursor to be located at or near an object in the computing device's display and give a command through the touch pad 104 to select that object. For example, the user may provide instructions to select the object by tapping the surface of the touch pad 104 one or more times.

The touch pad 104 is a capacitance module that includes a stack of layers disposed underneath the keyboard housing, underneath an overlay that is fitted into an opening of the keyboard housing, or underneath another capacitive reference surface. In some examples, the capacitance module is located in an area of the keyboard's surface where the user's palms may rest while typing. The capacitance module may include a substrate, such as a printed circuit board or another type of substrate. One of the layers of the capacitance module may include a sensor layer that includes a first set of electrodes oriented in a first direction and a second layer of electrodes oriented in a second direction that is transverse the first direction. These electrodes may be spaced apart and/or electrically isolated from each other. The electrical isolation may be accomplished by depositing at least a portion of the electrodes on different sides of the same substrate or providing dedicated substrates for each set of electrodes. Capacitance may be measured at the overlapping intersections between the different sets of electrodes. However, as an object with a different dielectric value than the surrounding air (e.g., finger, stylus, etc.) approach the intersections between the electrodes, the capacitance between the electrodes may change. This change in capacitance and the associated location of the object in relation to the capacitance module may be calculated to determine where the user is touching or hovering the object within the detection range of the capacitance module. In some examples, the first set of electrodes and the second set of electrodes are equidistantly spaced with respect to each other. Thus, in these examples, the sensitivity of the capacitance module is the same in both directions. However, in other examples, the distance between the electrodes may be non-uniformly spaced to provide greater sensitivity for movements in certain directions.

In some cases, the display 106 is mechanically separate and movable with respect to the keyboard with a connection mechanism 114. In these examples, the display 106 and keyboard 102 may be connected and movable with respect to one another. The display 106 may be movable within a range of 0 degrees to 180 degrees or more with respect to the keyboard 102. In some examples, the display 106 may fold over onto the upper surface of the keyboard 102 when in a closed position, and the display 106 may be folded away from the keyboard 102 when the display 106 is in an operating position. In some examples, the display 106 may be orientable with respect to the keyboard 102 at an angle between 35 to 135 degrees when in use by the user. However, in these examples, the display 106 may be positionable at any angle desired by the user.

In some examples, the display 106 may be a non-touch sensitive display. However, in other examples at least a portion of the display 106 is touch sensitive. In these examples, the touch sensitive display may also include a capacitance module that is located behind an outside surface of the display 106. As a user's finger or other object approaches the touch sensitive screen, the capacitance module may detect a change in capacitance as an input from the user.

While the example of FIG. 1 depicts an example of the electronic device being a laptop, the capacitance sensor and touch surface may be incorporated into any appropriate device. A non-exhaustive list of devices includes, but is not limited to, a desktop, a display, a screen, a kiosk, a computing device, an electronic tablet, a smart phone, a location sensor, a card reading sensor, another type of electronic device, another type of device, or combinations thereof.

Figure 2:
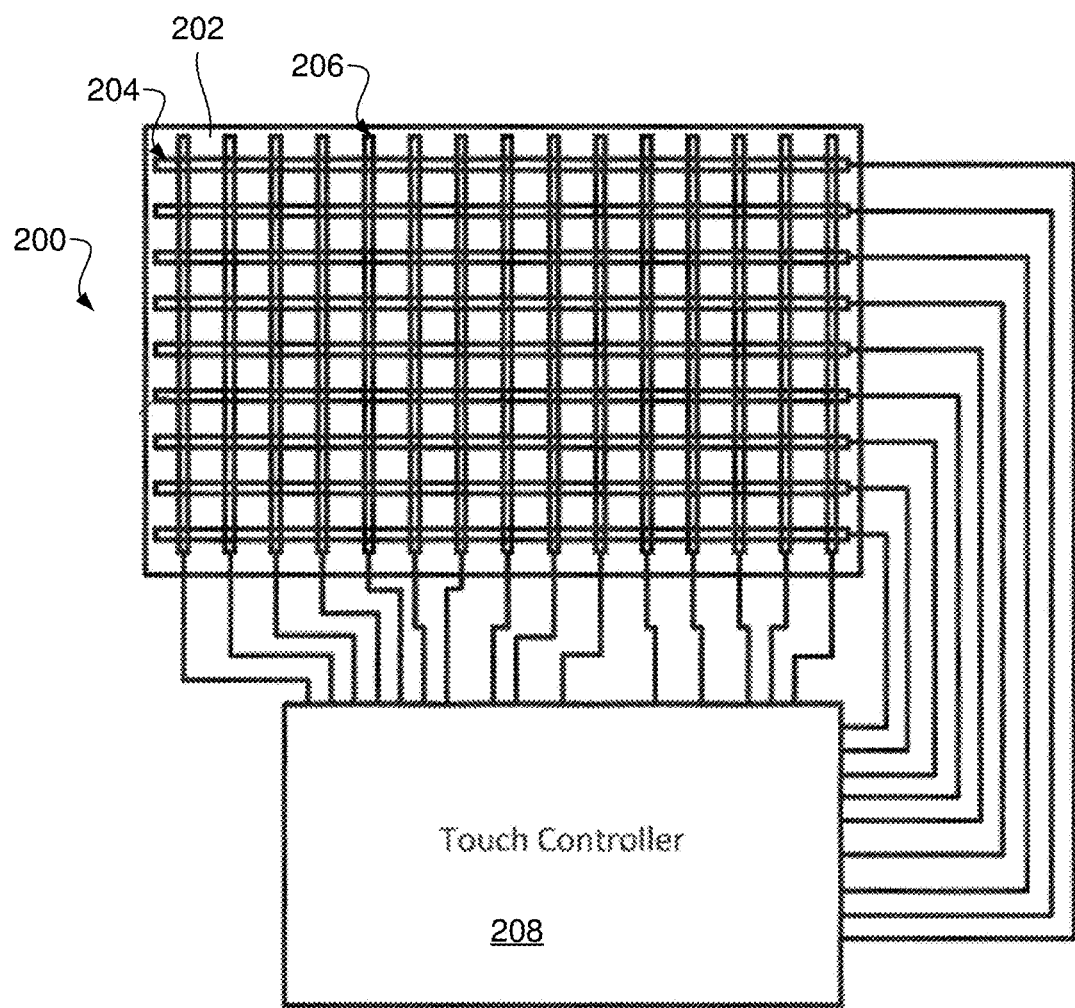
FIG. 2 depicts an example of a substrate with a first set of electrodes and a second set of electrodes in accordance with the disclosure.

FIG. 2 depicts an example of a portion of a capacitance module 200. In this example, the capacitance module 200 may include a substrate 202, first set 204 of electrodes, and a second set 206 of electrodes. The first and second sets 204, 206 of electrodes may be oriented to be transverse to each other. Further, the first and second sets 204, 206 of electrodes may be electrically isolated from one another so that the electrodes do not short to each other. However, where electrodes from the first set 204 overlap with electrodes from the second set 206, capacitance can be measured. The capacitance module 200 may include one or more electrodes in the first set 204 or the second set 206. Such a substrate 202 and electrode sets may be incorporated into a touch screen, a touch pad, a location sensor, a gaming controller, a button, and/or detection circuitry.

In some examples, the capacitance module 200 is a mutual capacitance sensing device. In such an example, the substrate 202 has a set 204 of row electrodes and a set 206 of column electrodes that define the touch/proximity-sensitive area of the component. In some cases, the component is configured as a rectangular grid of an appropriate number of electrodes (e.g., 8-by-6, 16-by-12, 9-by-15, or the like).

As shown in FIG. 2, the capacitance module 208 includes a capacitance controller 208. The capacitance controller 208 may include at least one of a central processing unit (CPU), a digital signal processor (DSP), an analog front end (AFE) including amplifiers, a peripheral interface controller (PIC), another type of microprocessor, and/or combinations thereof, and may be implemented as an integrated circuit, a field programmable gate array (FPGA), an application specific integrated circuit (ASIC), a combination of logic gate circuitry, other types of digital or analog electrical design components, or combinations thereof, with appropriate circuitry, hardware, firmware, and/or software to choose from available modes of operation.

In some cases, the capacitance controller 208 includes at least one multiplexing circuit to alternate which of the sets 204, 206 of electrodes are operating as drive electrodes and sense electrodes. The driving electrodes can be driven one at a time in sequence, or randomly, or drive multiple electrodes at the same time in encoded patterns. Other configurations are possible such as a self-capacitance mode where the electrodes are driven and sensed simultaneously. Electrodes may also be arranged in non-rectangular arrays, such as radial patterns, linear strings, or the like. A shield layer (see FIG. 3) may be provided beneath the electrodes to reduce noise or other interference. The shield may extend beyond the grid of electrodes. Other configurations are also possible.

In some cases, no fixed reference point is used for measurements. The touch controller 208 may generate signals that are sent directly to the first or second sets 204, 206 of electrodes in various patterns.

In some cases, the component does not depend upon an absolute capacitive measurement to determine the location of a finger (or stylus, pointer, or other object) on a surface of the capacitance module 200. The capacitance module 200 may measure an imbalance in electrical charge to the electrode functioning as a sense electrode which can, in some examples, be any of the electrodes designated in either set 204, 206 or, in other examples, with dedicated-sense electrodes. When no pointing object is on or near the capacitance module 200, the capacitance controller 208 may be in a balanced state, and there is no signal on the sense electrode.

When a finger or other pointing object creates imbalance because of capacitive coupling, a change in capacitance may occur at the intersections between the sets of electrodes 204, 206 that make up the touch/proximity sensitive area. In some cases, the change in capacitance is measured. However, in alternative example, the absolute capacitance value may be measured.

While this example has been described with the capacitance module 200 having the flexibility of the switching the sets 204, 206 of electrodes between sense and transmit electrodes, in other examples, each set of electrodes is dedicated to either a transmit function or a sense function.

Figure 3:
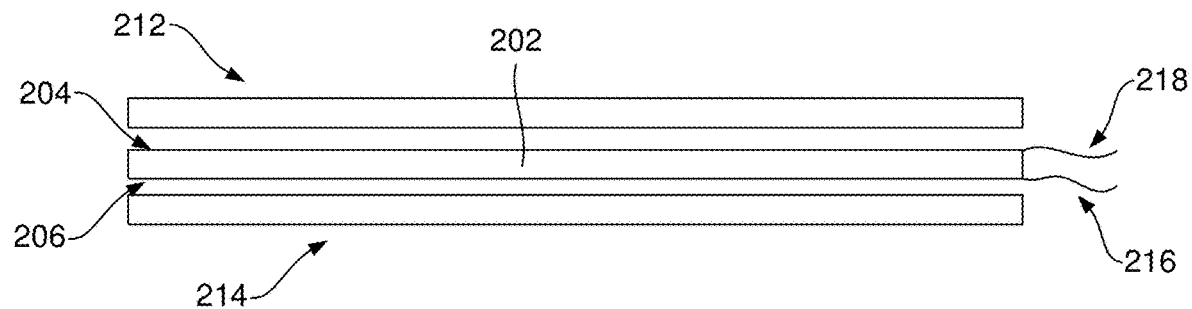
FIG. 3 depicts an example of a touch pad in accordance with the disclosure.

FIG. 3 depicts an example of a substrate 202 with a first set 204 of electrodes and a second set 206 of electrodes deposited on the substrate 202 that is incorporated into a capacitance module. The first set 204 of electrodes and the second set 206 of electrodes may be spaced apart from each other and electrically isolated from each other. In the example depicted in FIG. 3, the first set 204 of electrodes is deposited on a first side of the substrate 202, and the second set 206 of electrodes is deposited on the second side of the substrate 202, where the second side is opposite the first side and spaced apart by the thickness of the substrate 202. The substrate may be made of an electrically insulating material thereby preventing the first and second sets 204, 206 of electrodes from shorting to each other. As depicted in FIG. 2, the first set 204 of electrodes and the second set 206 of electrodes may be oriented transversely to one another. Capacitance measurements may be taken where the intersections with the electrodes from the first set 204 and the second set 206 overlap. In some examples, a voltage may be applied to the transmit electrodes and the voltage of a sense electrode that overlaps with the transmit electrode may be measured. The voltage from the sense electrode may be used to determine the capacitance at the intersection where the sense electrode overlaps with the transmit electrode.

In the example of FIG. 3 depicting a cross section of a capacitance module, the substrate 202 may be located between a capacitance reference surface 212 and a shield 214. The capacitance reference surface 212 may be a covering that is placed over the first side of the substrate 202 and that is at least partially transparent to electric fields. As a user's finger or stylus approach the capacitance reference surface 212, the presence of the finger or the stylus may affect the electric fields on the substrate 202. With the presence of the finger or the stylus, the voltage measured from the sense electrode may be different than when the finger or the stylus are not present. As a result, the change in capacitance may be measured.

The shield 214 may be an electrically conductive layer that shields electric noise from the internal components of the electronic device. This shield may prevent influence on the electric fields on the substrate 202. In some cases, the shield is solid piece of material that is electrically conductive. In other cases, the shield has a substrate and an electrically conductive material disposed on at least one substrate. In yet other examples, the shield is layer in the touch pad that performs a function and also shields the electrodes from electrically interfering noise. For example, in some examples, a pixel layer in display applications may form images that are visible through the capacitance reference surface, but also shields the electrodes from the electrical noise.

The voltage applied to the transmit electrodes may be carried through an electrical connection 216 from the touch controller 208 to the appropriate set of electrodes. The voltage applied to the sense electrode through the electric fields generated from the transmit electrode may be detected through the electrical connection 218 from the sense electrodes to the touch controller 208.

While the example of FIG. 3 has been depicted as having both sets of electrodes deposited on a substrate, one set of electrodes deposited on a first side and a second set of electrodes deposited on a second side; in other examples, each set of electrodes may be deposited on its own dedicated substrate.

Further, while the examples above describe a touch pad with a first set of electrodes and a second set of electrodes; in some examples, the capacitance module has a single set of electrodes. In such an example, the electrodes of the sensor layer may function as both the transmit and the receive electrodes. In some cases, a voltage may be applied to an electrode for a duration of time, which changes the capacitance surrounding the electrode. At the conclusion of the duration of time, the application of the voltage is discontinued. Then a voltage may be measured from the same electrode to determine the capacitance. If there is no object (e.g., finger, stylus, etc.) on or in the proximity of the capacitance reference surface, then the measured voltage off of the electrode after the voltage is discontinued may be at a value that is consistent with a baseline capacitance. However, if an object is touching or in proximity to the capacitance reference surface, then the measured voltage may indicate a change in capacitance from the baseline capacitance.

In some examples, the capacitance module has a first set of electrodes and a second set of electrodes and is communication with a controller that is set up to run both mutual capacitance measurements (e.g., using both the first set and the second set of electrodes to take a capacitance measurement) or self-capacitance measurements (e.g., using just one set of electrodes to take a capacitance measurement).

Figure 4:
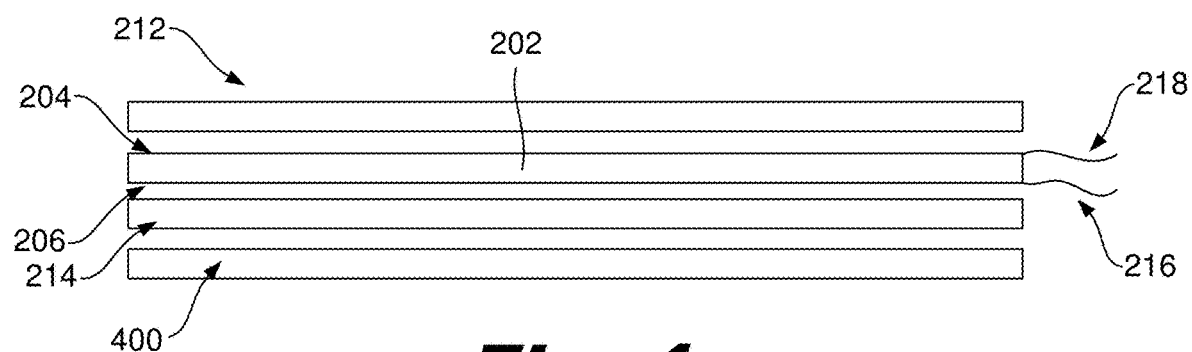
FIG. 4 depicts an example of a touch screen in accordance with the disclosure.

FIG. 4 depicts an example of a capacitance module incorporated into a touch screen. In this example, the substrate 202, sets of electrodes 204, 206, and electrical connections 216, 218 may be similar to the arrangement described in conjunction with FIG. 3. In the example of FIG. 4, the shield 214 is located between the substrate 202 and a display layer 400. The display layer 400 may be a layer of pixels or diodes that illuminate to generate an image. The display layer may be a liquid crystal display, a light emitting diode display, an organic light emitting diode display, an electroluminescent display, a quantum dot light emitting diode display, an incandescent filaments display, a vacuum florescent display, a cathode gas display, another type of display, or combinations thereof. In this example, the shield 214, the substrate 202, and the capacitance reference surface 212 may all be at least partially optically transparent to allow the image depicted in the display layer to be visible to the user through the capacitance reference surface 212. Such a touch screen may be included in a monitor, a display assembly, a laptop, a mobile phone, a mobile device, an electronic tablet, a dashboard, a display panel, an infotainment device, another type of electronic device, or combinations thereof.

Figure 5:
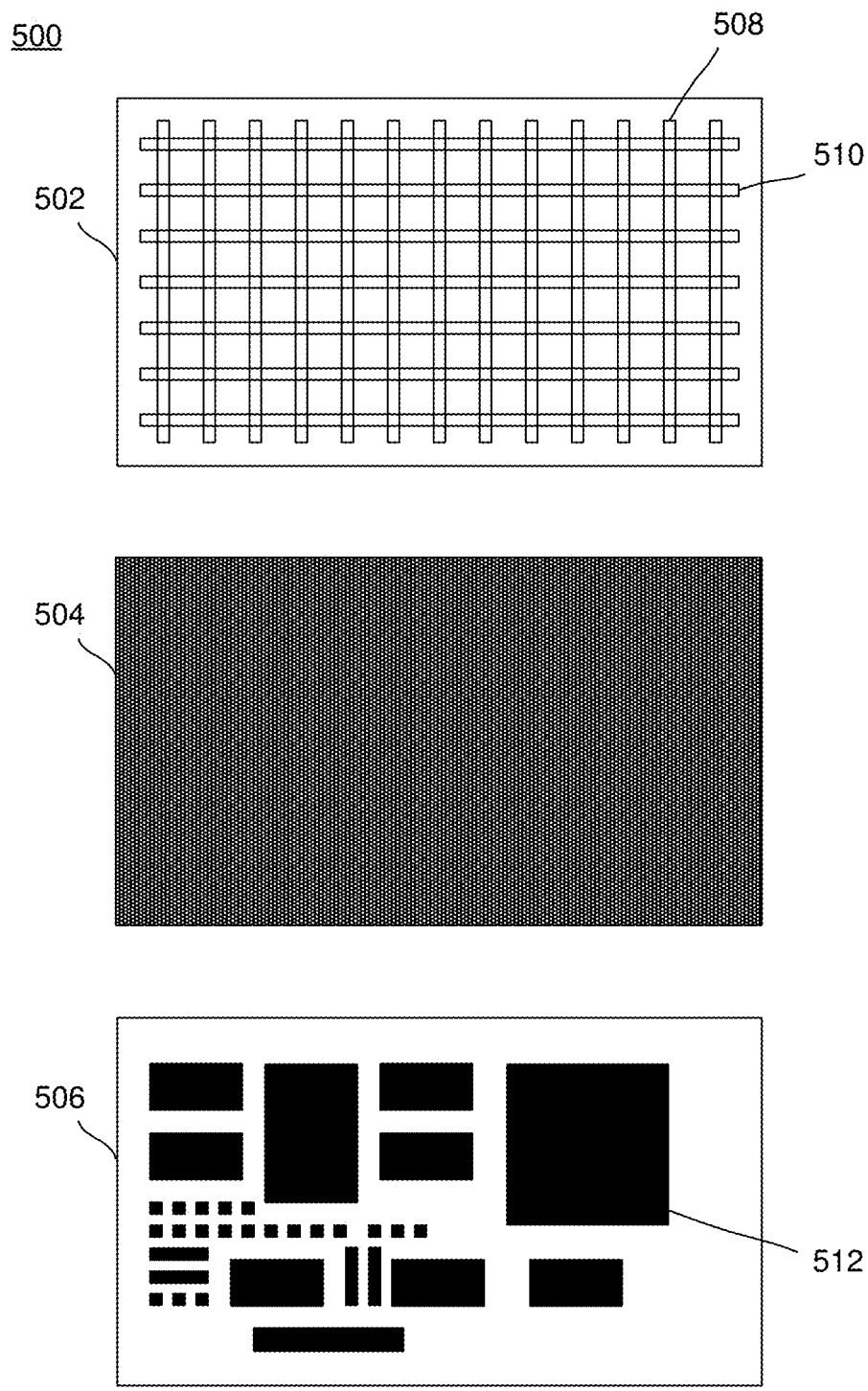
FIG. 5 depicts an example of a capacitance module in accordance with the disclosure.

FIG. 5 depicts an example of a capacitance module 500. In this example, the capacitance module 500 is a stack of three layers, including a sensor layer 502, a shield layer 504, and a component layer 506. While the capacitance module 500 in this example includes three layers, in other examples, a capacitance module may include a different number of layers. For example, a capacitance module may include four layers, five layers, or a different number of layers.

The sensor layer 502 may include a first set 508 of electrodes and a second set 510 of electrodes which may be used in a capacitance circuit to detect and/or measure changes in capacitance. While this example depicts a sensor layer 502 with two sets of electrodes, in other examples, a sensor layer may include one set of electrodes, three sets of electrodes, or a different number of sets of electrodes. While this example depicts a single sensor layer 502, in other examples a capacitance module may include more than one sensor layer.

The first set 508 of electrodes and the second set 510 of electrodes may operate using mutual capacitance, self-capacitance, or combinations thereof. In examples where a sensor layer includes a single set of electrodes, the single set of electrodes may operate using self-capacitance. In other examples, the first and second sets of electrodes are located on different layers.

The shield layer 504 is located adjacent to the sensor layer 502 within the capacitance module 500. In other examples, a shield layer may be in another location relative to other layers in the stack.

The shield layer 504 may include a material which blocks or reduces electromagnetic and/or electrical interference. In some examples, a shield layer may be made of a conductive material such as copper, aluminum, silver, or combinations thereof. In other examples, a shield layer may be a composite material such as plastic, glass, another composite structure, or combinations thereof. In yet other examples, a shield layer may be a shielding material coating applied to a substrate, such as indium tin oxide (ITO), graphene, a conductive polymer, another coating, or combinations thereof. In some cases, a shield layer's material may be a magnetic material, such as iron, ferrite, another metal, composites thereof, alloys thereof, mixtures thereof, or combinations thereof.

In this example, the shield layer 504 is located between the sensor layer 502 and the component layer 506. The shield layer 504 may help prevent electromagnetic interference originating from components 518 on the component layer 506 or sources external to the capacitance module from interfering with the first set 508 and/or second set 510 of electrodes on the sensor layer 502.

Shielding the sensor layer 502 with the shield layer 504 may improve the accuracy and stability of capacitance measurements measured by first set 508 and second set 501 of electrodes. Shielding the sensor layer 502 may also reduce noise, which may increase the sensitivity and accuracy of user inputs on the capacitance module 500. The shield layer 504 may be positioned to block interference from a battery, power sources, memory resources, processing resources, electronic components, other components, or combinations thereof that may be positioned within a cavity of the electronic device.

In this example, the component layer 506 is adjacent to the shield layer 504. In other examples, a component layer may be in another location relative to other layers in a stack or parts of a capacitance module. The component layer 506 includes components 512.

The component layer 506 may include components 512 which facilitate the functionality of the capacitance module 500. Components on a component layer may include a central processing unit (CPU), a microcontroller, an op-amp, a memory unit, a field-programmable gate array (FPGA), a graphics processing unit (GPU), an interface controller, a power management integrated circuit, processing resources, an antenna, another type of component, or combinations thereof.

Figure 6A:
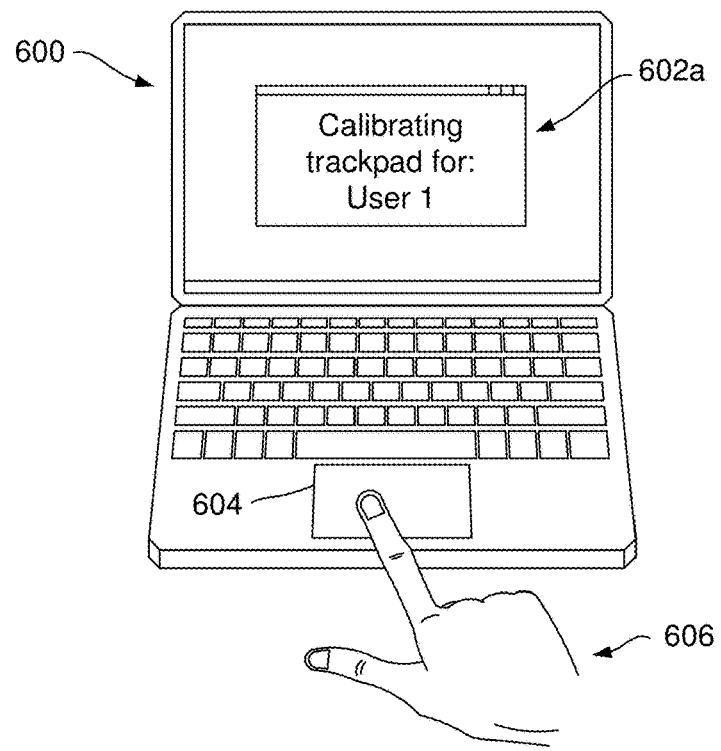
FIG. 6a depicts an example of an electronic device in accordance with the disclosure.

FIG. 6a depicts an example of an electronic device 600 displaying a calibration prompt 602a to a first user 606 to provide calibration input on an input device 604 during a calibration process. The calibration prompt 602a may be displayed on the screen of the electronic device 600. The calibration prompt 602a may instruct the first user 606 to interact with the input device 604 in a specific way.

The input device 604 may be a trackpad or other capacitive sensing device.

During the calibration phase, the electronic device 600 may prompt the first user 606 to perform various types of input gestures, which may include swipes, taps, presses, multi-touch gestures, handwriting, drawing, or other gestures on the input device 604. In some embodiments, the gesture prompt may include asking the user to draw a line, draw a shape, draw a symbol, write a word, As the first user 606 provides these inputs, the capacitance module within the input device 604 may capture and store measurements of user attributes associated with the first user. These user attributes may include speed attributes, movement attributes, gesture endpoint attributes, line speed attributes, acceleration attributes, deceleration attributes, spacing attributes, pressure attributes, dimension attributes, signal attributes, image attributes, multi-touch attributes, typing attributes, another type of user attribute, or combinations thereof.

The user attributes captured during the calibration process may be stored in memory of the capacitance module or computer 600. The user attributes may form a unique user profile for the first user 606. The user profile may later be used to identify the first user 606 during normal operation of the electronic device 600.

Figure 6B:
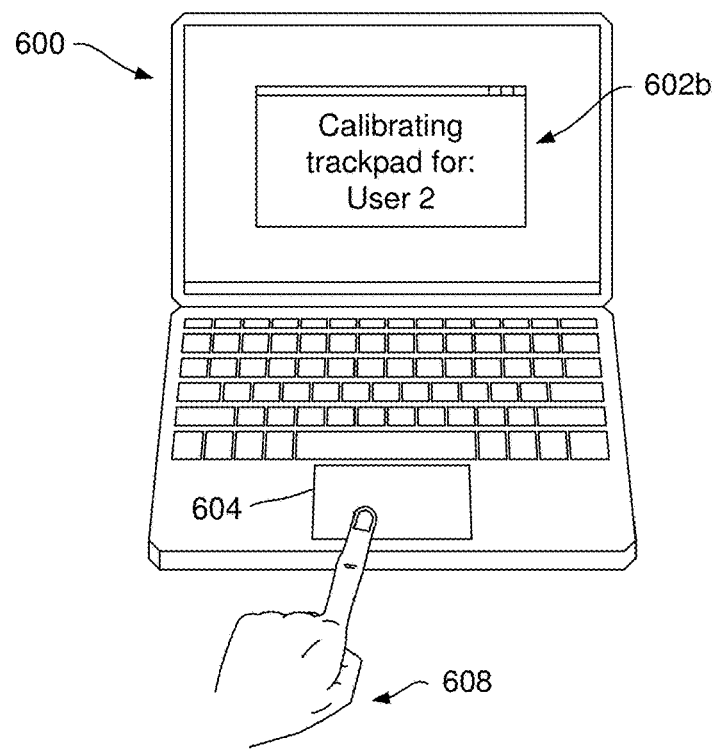
FIG. 6b depicts an example of an electronic device in accordance with the disclosure.

FIG. 6b depicts an example of the electronic device 600 displaying a calibration prompt 602b to a second user 608 to provide calibration input on the input device 604 during a calibration process. The calibration prompt 602b may instruct the second user 608 to interact with the input device 604 in a specific way, similar to the process described for the first user 606 in FIG. 6a.

The calibration prompt 602b may instruct the second user 608 to interact with the input device 604, allowing the capacitance module within the input device to capture and store measurements of user attributes associated with the second user. The user attributes captured during the calibration process may form a unique user profile for the first user 608.

By performing the calibration process for multiple users, the system may create distinct user profiles that capture the unique input characteristics of each user. These profiles, stored in the memory of the capacitance module or the electronic device 600, may then be used as reference data for identifying which user is interacting with the device at any given time.

When a user provides input on the input device 604 during normal operation, the capacitance module may compare the attributes of the input to the stored user profiles to determine the most likely identity of the current user. This may allow the electronic device 600 to automatically adapt its settings, preferences, or security permissions based on the identified user, providing a seamless and personalized user experience. While this example has been described with reference to calibrating for multiple users and/or creating profiles for each of those users, in other examples the system may calibrate and/or create a profile for just a single user.

Figure 7A:
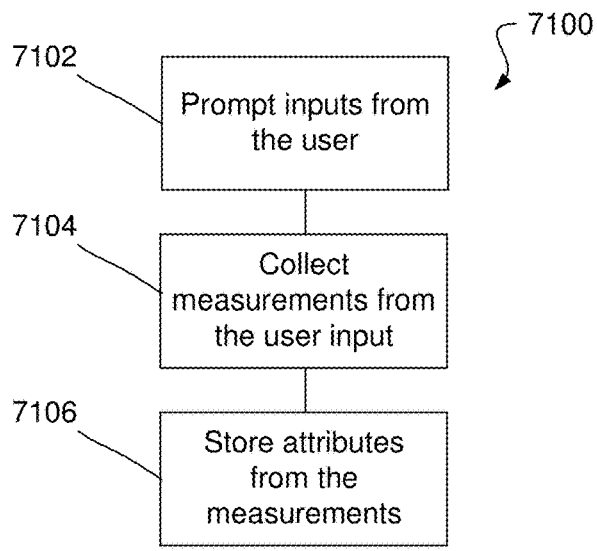
FIG. 7A depicts an example of a method for identifying a user in accordance with the disclosure.

FIG. 7A depicts an example of a method 7100 for identifying the user using the capacitance module. In this example, the method 7100 includes prompting 7102 the user to make an input that can be detected with the capacitance module, collecting 7104 measurements from the user input with the capacitance module, and storing 7106 attributes derived from the measurements.

In some cases, the method may optionally include deriving the attributes from the capacitance measurements. These attributes may include dimension attributes, speed attributes, movement attributes, capacitance signal attributes, multi-touch attributes, image attributes, typing attributes, another type of attribute, or combinations thereof.

Further, the method may optionally include creating a user profile and associating the attributes with the user profile. In some cases, the attributes are stored locally on the memory of the capacitance module. In other cases, the attributes may be stored in memory of the electronic device or to a networked device. In examples where the stored attributes are not stored in the memory of the capacitance controller, the capacitance controller may have access to the stored attributes.

Figure 7B:
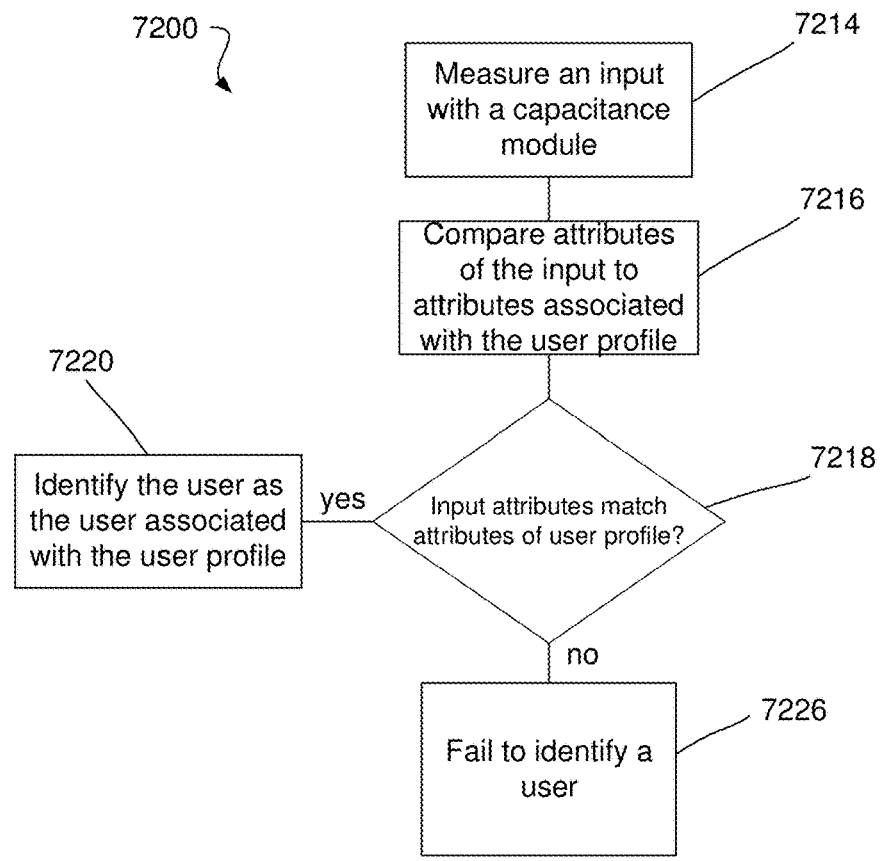
FIG. 7B depicts an example of a method for identifying a user in accordance with the disclosure.

FIG. 7B depicts an example of a method 7200 for identifying the user using the capacitance module. The method 7200 may include measuring 7214 a user input with a capacitance module, and comparing 7216 attributes derived from the user input to attributes associated with the user profile. The method 7200 may also include a determination 7218 of whether the attributes associated with the user input match the attributes associated with the user profile. If yes, the method 7200 may include identifying 7220 the user as the user associated with the user profile. If no, the method 7200 may include failing 7226 to identify the user. In other examples, if the attributes of associated with the user input fail to match the attributes associated with the user profile, the method may include defaulting to another task, denying access to specific files or information, denying authentication, identifying the user through another method, updating the stored attributes, performing another task, or combinations thereof.

Figure 7C:
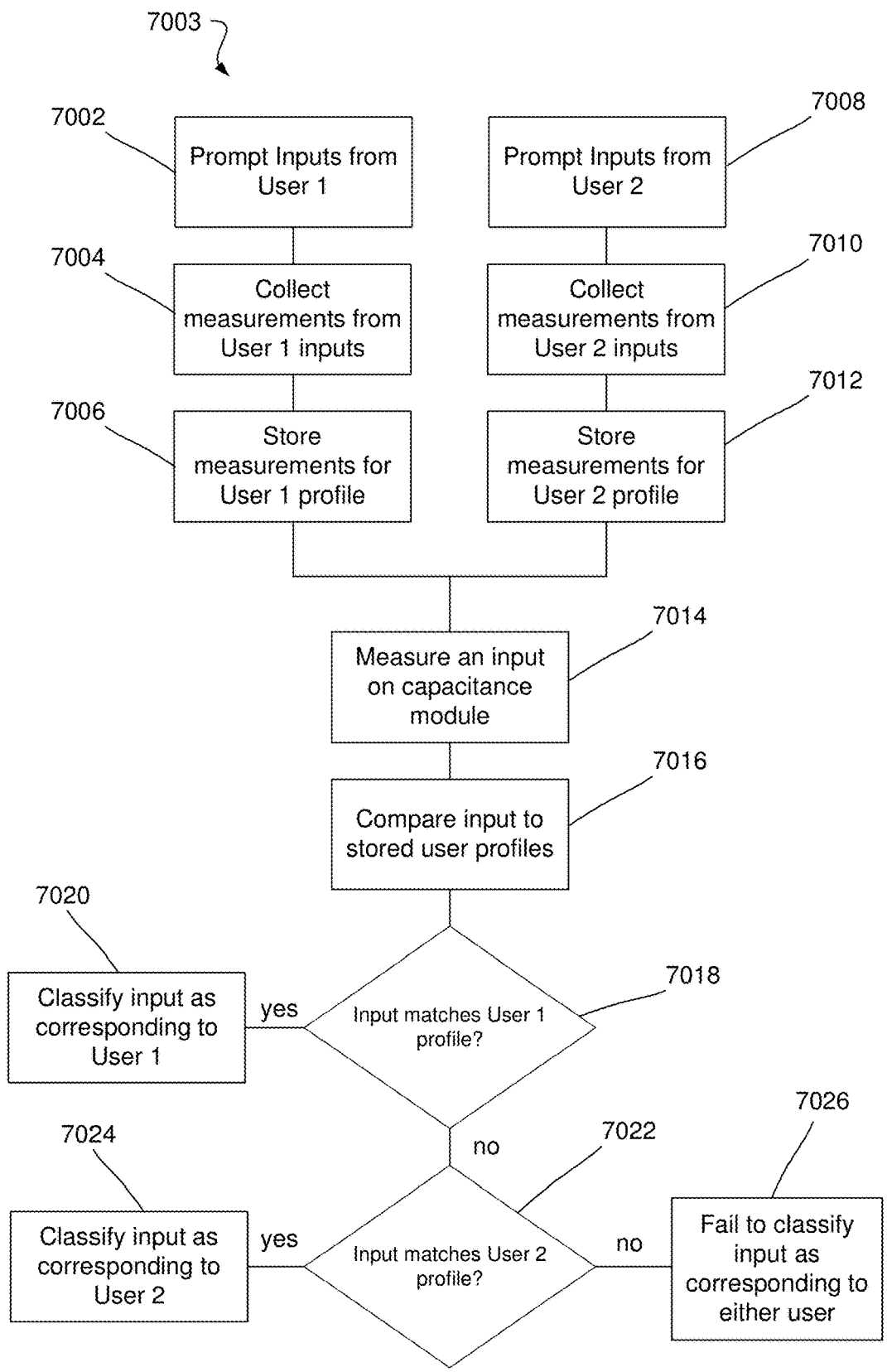
FIG. 7C depicts an example of a method for identifying a user in accordance with the disclosure.

FIG. 7C depicts an example of a method 7000 for identifying the user using the capacitance module. The system may prompt 7002 inputs from a first user, collect 7004 measurements from inputs from the first user, and store 7006 the measurements or attributes derived from the measurements so that they are associated with a first user profile for the first user. The system may prompt 7008 inputs from a second user, collect 7010 measurements from inputs from the second user, and store 7012 the measurements or attributes derived from the measurements so that they are associated with a second user profile for the second user. This process may allow the system to capture the unique input attributes of multiple users and create reference data for later user identification.

The method 7000 may also include measuring 7014 an input with the capacitance module. The method 7000 may compare 7016 the attributes of the input to the attributes associated with the user profiles and determine 7018 if the input matches the attributes of the first user profile. If the attributes match the stored attributes of the first user, the system may identify 7020 the input as corresponding to the first user. If the attributes do not match the stored attributes of the first user, the system may determine 7022 if the stored attributes match the stored attributes of the second user profile. If the attributes match the stored attributes of the second user, the system may identify 7024 the input as corresponding to the second user. If the attributes do not match, the system may fail 7026 to classify the input as corresponding to either user or perform another task.

In some examples, the system may continuously compare input attributes with the stored attributes associated with one or more user profiles. In some cases, by continuously comparing input attributes to stored user profiles, a capacitance module may dynamically identify which user is interacting with the device at any given moment, enabling personalized responses and adaptive functionality based on the user's identity.

In other examples, the method may include periodically confirming the identity of the user. For example, the method may initiate the steps involved with identifying the user based at least in part on a predetermined period of time, a predetermined number of inputs, a predetermined event, predetermined time period where no inputs are detected with the capacitance module, another condition, or combinations thereof.

Figure 8:
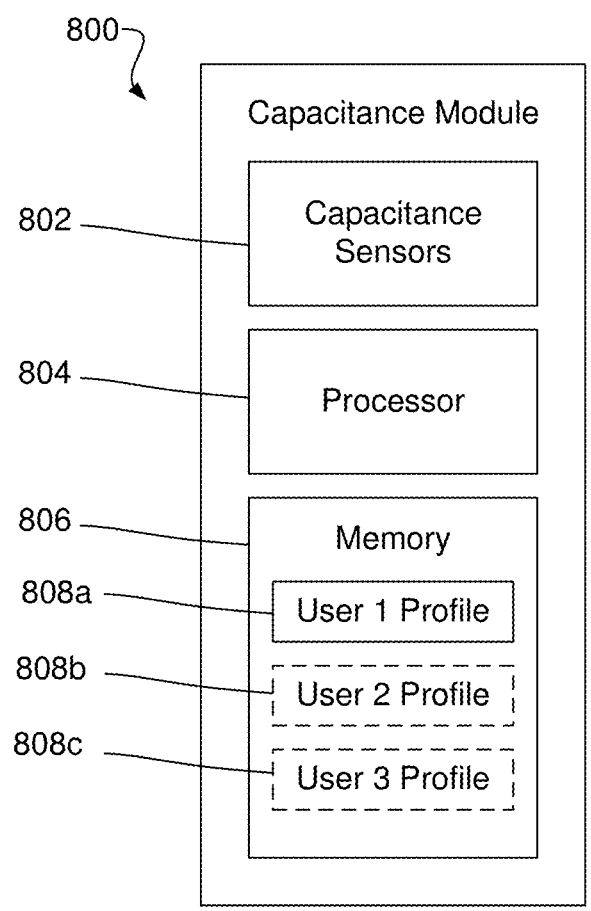
FIG. 8 depicts an example of a capacitance module in accordance with the disclosure.

FIG. 8 depicts an example of a capacitance module 800 in accordance with the disclosure. In this example, the capacitance module 2200 includes programmed instructions in memory and may include associated firmware, logic, processing resources, memory resources, power sources, hardware, or other types of hardware to carry out the tasks of the capacitance module 2200. The capacitance module 800 includes capacitance sensors 802, a processor 804, and memory 806.

When a user interacts with the capacitance module 800 during a calibration process, the capacitance sensors 802 may capture measurements of the user input. The measurements may be processed by the processor 804, which may perform signal conditioning, normalization, feature extraction, or other computational tasks to derive meaningful attributes from the sensor measurements.

The extracted user input attributes may be stored in memory 806 within the capacitance module 800. The memory 806 may contain user profiles 808a, 808b, and 808c, which correspond to the unique input characteristics of distinct users. While the memory 806 depicted in this example includes three user profiles, in other examples, memory may include a different number of user profiles.

Each user profile 808a, 808b, 808c may include a collection of attributes such as speed attributes, movement attributes, gesture endpoint attributes, pressure attributes, signal attributes, image attributes, dimension attributes, multi-touch attributes, typing attributes, or other types of user attributes that are representative of that user's typical input style. These profiles may serve as reference data for the processor 804 to compare against when trying to identify the current user of the capacitance module 800 during normal operation.

During normal operation, when a user interacts with the capacitance module 800, the capacitance sensors 802 may capture the input attributes of the input, and the processor 804 may compare these attributes against the stored user profiles 808a, 808b, and 808c in the memory 806. By finding the closest match between the input attributes and the user profiles, the processor 804 may determine the most likely identity of the current user. This identification process may allow the capacitance module 800 to adapt its behavior, settings, or security permissions based on the recognized user, providing a personalized and secure user experience.

Figure 9:
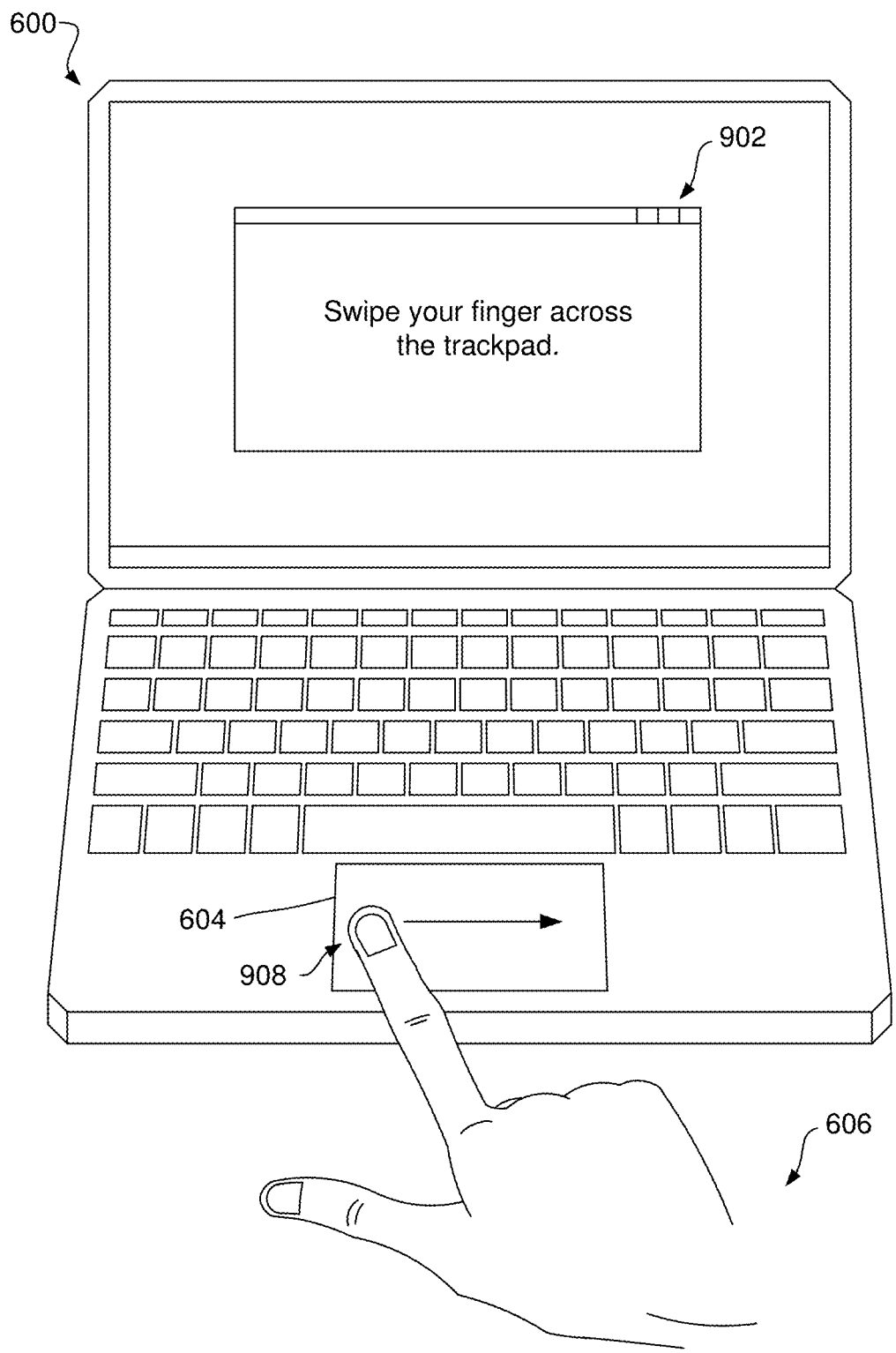
FIG. 9 depicts an example of an electronic device in accordance with the disclosure.

FIG. 9 depicts an example of the electronic device 600 displaying a prompt 902 to a user 606 to swipe a finger across the input device 604. As the user 606 swipes a finger across the input device 604, the capacitance module within the input device may detect and measure the user input 908.

Different users may exhibit distinct swiping behaviors, particularly in terms of the speed at which they perform the gesture. Some users may swipe quickly and decisively, while others may move their finger more slowly and deliberately across the input device 604. These differences in swiping speed may be captured as speed attributes and be used for user identification purposes.

As the user 606 performs the swiping user input 908, the capacitance module within the input device 604 may record the position of the user's finger over time. By analyzing the rate of change of the finger position, the module may calculate the speed of the user input 908. This speed attribute may be characterized in various ways, such as average speed, peak speed, or speed profile over the course of the swipe.

The speed attribute extracted from the user input 908 may be stored as part of the user's profile, along with other relevant attributes of the input, such as the starting and ending positions of the swipe, the pressure applied during the gesture, the capacitance pattern of the user's finger, or other relevant attributes. By collecting and storing these attributes during the calibration phase, the system may create a unique signature for each user based on their input characteristics.

During normal operation of the electronic device 600, when a user performs a swiping input on the input device 604, the capacitance module may measure the speed attribute of the input and compare it to the stored user profiles. If the speed attribute matches closely with a particular user's profile, the system may infer that the input is likely to have been performed by that user. This may allow the electronic device 600 to adapt its behavior or security settings based on the identified user, providing a personalized and secure user experience.

Figure 10:
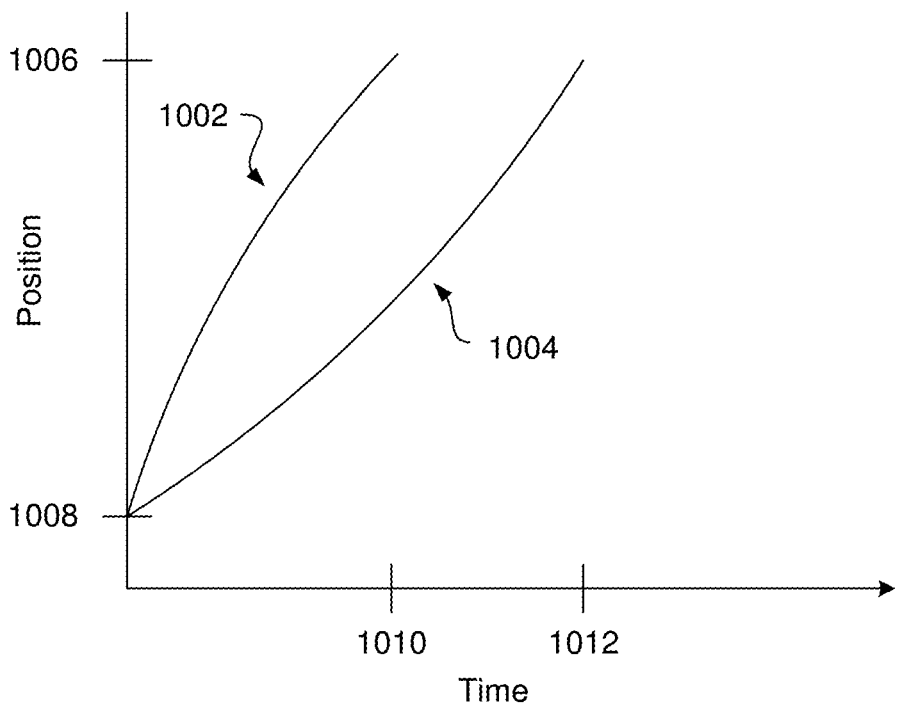
FIG. 10 depicts an example of a position time graph in accordance with the disclosure.

FIG. 10 depicts a graph in accordance with the disclosure. Two distinct signals represent different users or different input instances. Reference surface position is represented along the y axis and time is represented along the x axis.

A first signal 1002 shows a rapid change in position, moving from a starting point 1008 to an ending point 1006 at time 1010. This suggests a fast-swiping gesture, where the user quickly moves their finger across the reference surface of the capacitance module. In contrast, a second signal 1004 shows a more gradual change in position, moving from the starting point 1008 to the ending point 1006 at time 1012. This slower movement may indicate a user with a more relaxed or deliberate swiping style.

This example demonstrates that different users may take different amounts of time to perform the same input, such as moving their finger from one position to another. By measuring the time taken to reach a specific position, the capacitance module may calculate the speed of the user input and use this speed attribute as a distinguishing factor for user identification.

A speed attribute may be quantified in various ways, such as average speed over the entire gesture, the instantaneous speed at different time points, or the acceleration profile of the finger movement. These metrics may be extracted from the raw position-over-time data and stored as part of each user's profile.

When a new input is received, the system may compare its speed attributes to the stored user profiles and find the closest match. If the input's speed characteristics align closely with a particular user's profile, the system may infer that the input is likely to have been performed by that user. This may allow for user identification based on the unique temporal dynamics of their interactions with a capacitance module.

Figure 11:
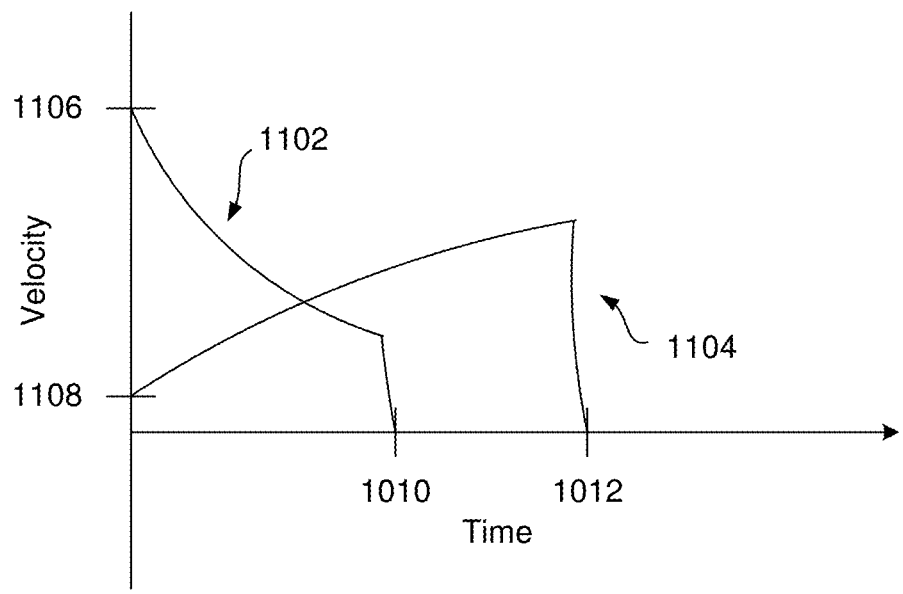
FIG. 11 depicts an example of a velocity time graph in accordance with the disclosure.

FIG. 11 depicts a graph in accordance with the disclosure. Two signals represent the signals 1002 and 1004 depicted in FIG. 10. A third signal 1102 represents the velocity verses time of the first signal 1002, and a fourth signal 1104 represents the velocity verses time of the second signal 1004.

The third signal 1102 shows a rapid increase in velocity, peaking at a value 1106 before quickly decreasing back to zero. This velocity profile may be characteristic of a fast, decisive swipe gesture where the user accelerates their finger rapidly and then decelerates as they approach the end of the swipe. The fourth signal 1104 shows a more gradual increase in velocity, reaching a lower peak value of 1108 and maintaining a relatively constant speed for a longer duration before decelerating. This velocity profile may suggest a slower, more controlled swiping motion where the user maintains a steady speed throughout the gesture.

Figure 12:
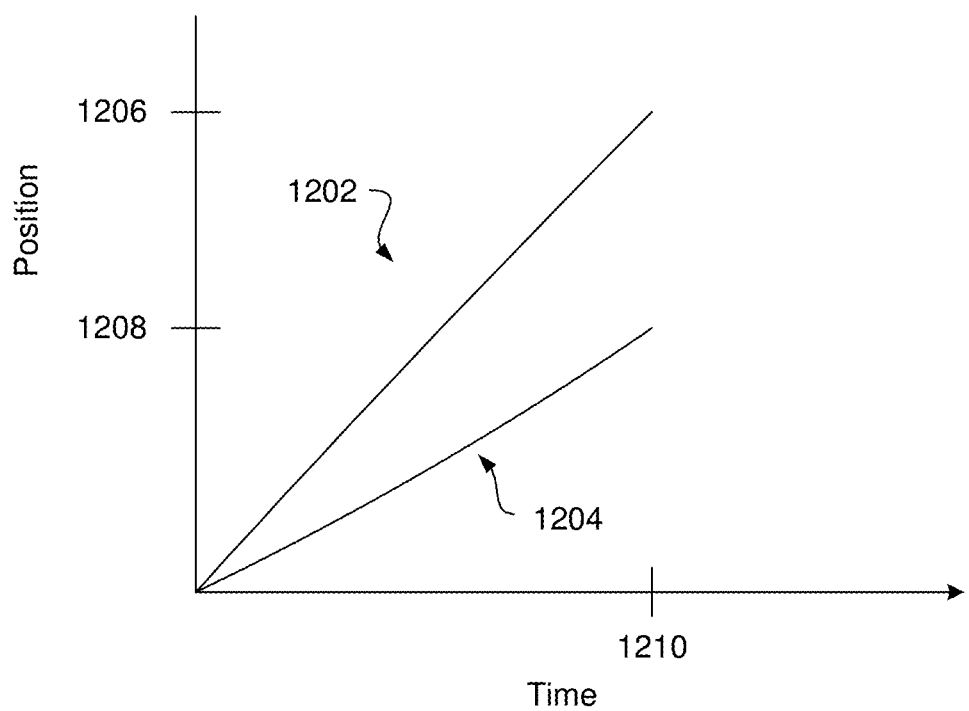
FIG. 12 depicts an example of a position time graph in accordance with the disclosure.

FIG. 12 depicts a graph in accordance with the disclosure. A first signal 1202 and second signal 1204 are plotted as positions verses time. The first signal 1202 and second signal 1204 start at the same initial position and take approximately the same amount of time to reach their respective final positions at time 1210; however, the ending positions of the first signal 1202 and second signal 1204 are different, with the first signal travelling a longer distance 1206 and the second signal travelling a shorter distance 1208.

The difference in travel distance between the first signal 1202 and the second signal 1204 may be attributed to the individual gesture behaviors of different users. Some users may prefer short, quick swipes that cover a limited area of the trackpad, while others may use longer, more expansive swipes that traverse a greater distance.

The distance traveled during a swipe or other gesture may be an informative user attribute for user identification, as it may reflect a user's natural tendencies in terms of gesture size and spatial coverage. By measuring the start and end positions of a swipe gesture and calculating the Euclidean distance between them, the capacitance module may quantify the movement attribute associated with a user gesture.

A capacitance module may collect movement attributes by prompting several types of gestures. For example, a user may be prompted to perform a swipe gesture, a drag gesture, a tap gesture, a double tap gesture, a corner press gesture, another gesture, or combinations thereof.

Figure 13:
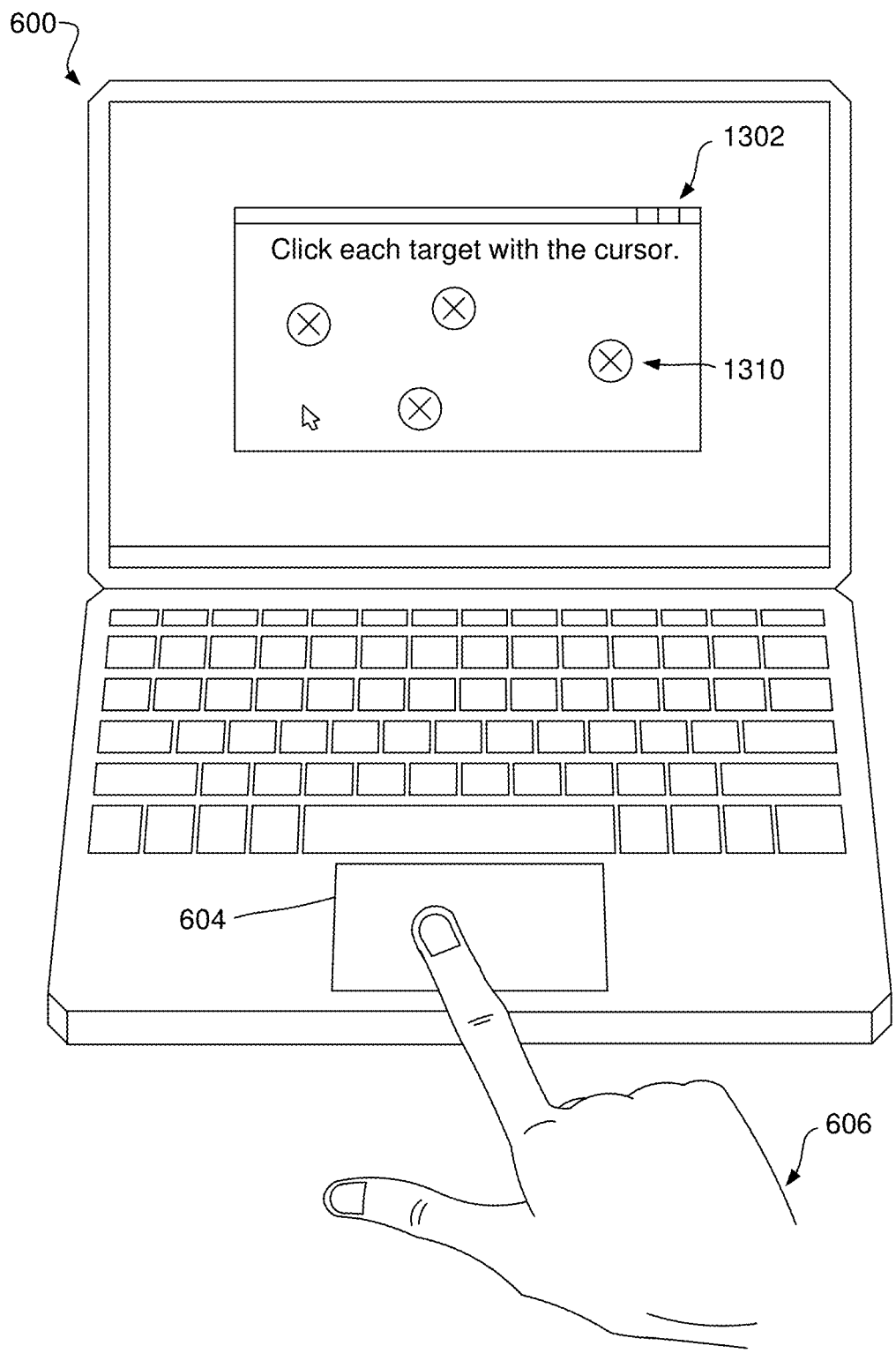
FIG. 13 depicts an example of an electronic device in accordance with the disclosure.

FIG. 13 depicts the electronic device 600 displaying a prompt 1302 for the user 606 to click several targets 1310 displayed on the screen of the computer. The user 606 may perform a series of taps and swipes on the input device 604 in response to the prompt 1302.

This calibration scenario may be employed to capture gesture endpoint attributes corresponding to the user 606.

By presenting multiple targets at different locations on the screen and recording the user's 606 input behavior for each target, the system may collect a dataset of gesture endpoint attributes that are representative of the user's unique input style. Some users may consistently click very close to each target 1310, indicating high precision, while other users may exhibit more variability in their clicking accuracy. Similarly, some users may approach each target 1310 quickly and decisively, while other users may slow down and carefully adjust their cursor position before clicking.

Figure 14A:
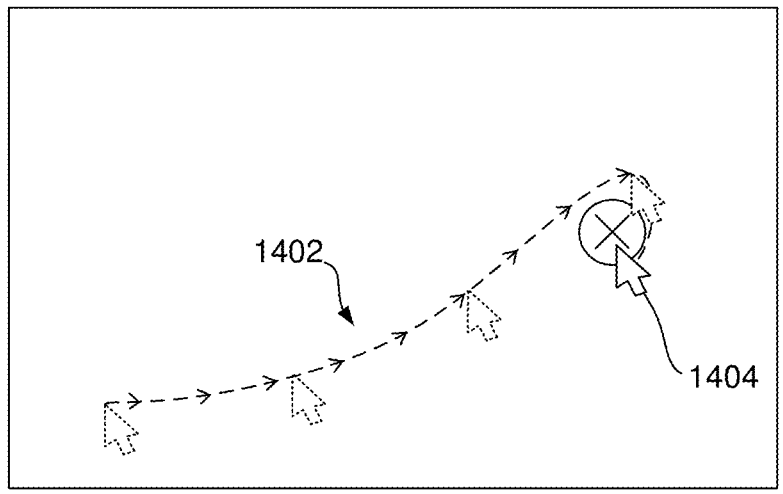
FIG. 14a depicts an example of a user interaction in accordance with the disclosure.
Figure 14B:
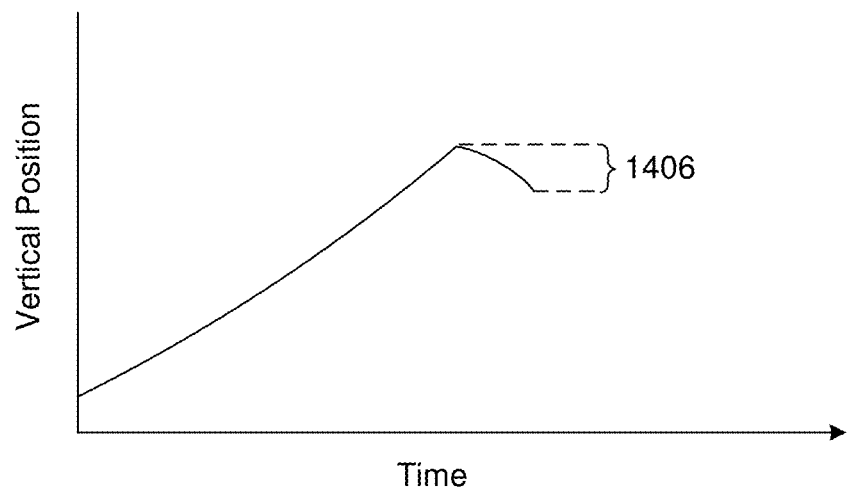
FIG. 14b depicts an example of a position time graph in accordance with the disclosure.

FIG. 14a depicts a user input path 1402. The path 1402 depicts the position of a cursor 1404 as it moves across a screen and clicks a target. FIG. 14b depicts a vertical position verses time graph corresponding to the user input path 1402. The user input path 1402 initially overshoots the target, meaning that the user's initial movement carries the cursor 1404 beyond the intended target location. This overshooting behavior may be a common occurrence in human-computer interaction, as users often make rapid movements towards a target and then fine-tune their position using smaller, corrective movements. The difference between the peak vertical position of the cursor 1404 and the target's actual vertical position represents the overshoot offset 1406. This offset may be measured and stored as a gesture endpoint attribute, capturing the magnitude of the user's overshooting tendency.

In this example, the gesture endpoint attribute is an overshooting tendency. In other examples, a gesture endpoint attribute may be an overshoot, the time taken to correct an overshoot, the number of corrective movements required to reach a target, the final precision of a click relative to a target center, an undershoot, the time taken to correct an undershoot, the number of swipes to reach an endpoint target over a predetermined distance, another tendency, or combinations thereof. A gesture endpoint attribute may include an average measurement, an aggregate measurement, another measurement, or combinations thereof.

During normal operation of a capacitance module, when a user performs a clicking action on the reference surface of the module, the system may measure the gesture endpoint attributes of the new input and compare them to the gesture endpoint attributes of stored user profiles. If the attributes of the new input match a particular user's profile, the system may infer that the input is likely to have been performed by that user.

By leveraging gesture endpoint attributes, the system may capture the nuances of each user's target acquisition and fine motor control behaviors. These attributes may provide an additional layer of discriminative information that can complement other user attributes, such as speed attributes, movement attributes, other attributes, or combinations thereof.

Figure 15:
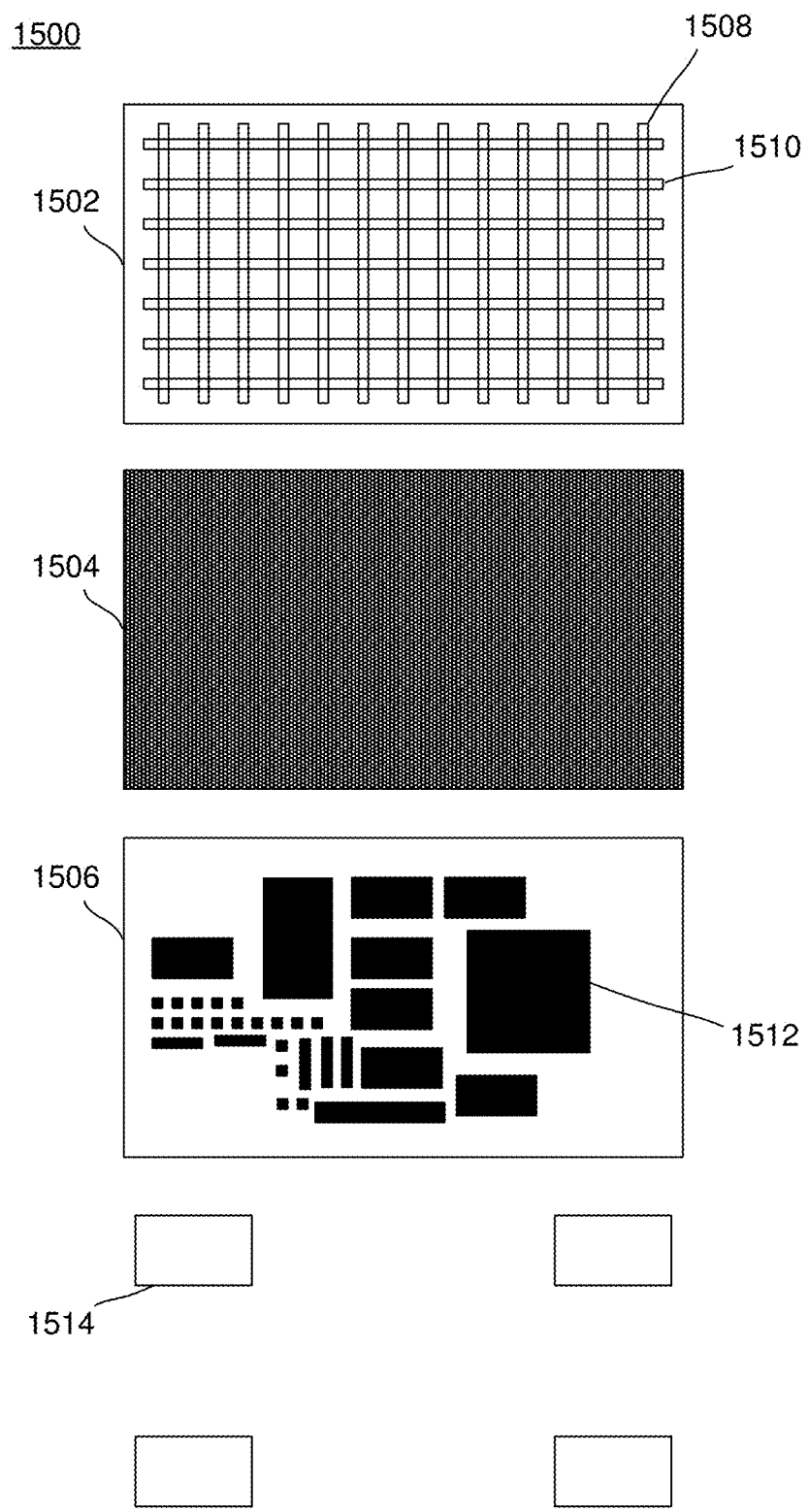
FIG. 15 depicts an example of a capacitance module in accordance with the disclosure.

FIG. 15 depicts an example of a capacitance module 1500 in accordance with the disclosure. In this example, the capacitance module 1500 includes a sensor layer 1502 with a first set 1508 and second set 1510 of electrodes, a shield layer 1504, a component layer 1506 with components 1512, and pressure sensors 1514. In this example, the pressure sensors 1514 are located adjacent to the component layer 1506. In other examples, pressure sensors may have a different relative location in a capacitance module.

In this example, the capacitance module 1500 includes four pressure sensors 1514. In other examples, a capacitance module may have a different number of pressure sensors.

When a user applies pressure to the reference surface of the capacitance module 1500, mechanical deformation may be transmitted through the various layers 1502, 1504, 1506 and be registered by the pressure sensors 1514. The pressure sensors 1514 may provide a direct measurement of the applied force, complementing capacitive measurements taken by the electrodes on the sensor layer 1502.

The pressure sensors 1514 may be strain gauges, piezoelectric pressure sensors, inductance coil pressure sensors, another type of pressure sensor, or combinations thereof. A non-exhaustive list of suitable pressure sensors includes, but is not limited to, piezoelectric sensors, magnetostrictive sensors, potentiometric pressure sensors, inductive pressure sensors, capacitive pressure sensors, strain gauge pressure sensors, variable reluctance pressure sensors, non-capacitance pressure sensors, other types of pressure sensors, or combinations thereof.

Figure 16:
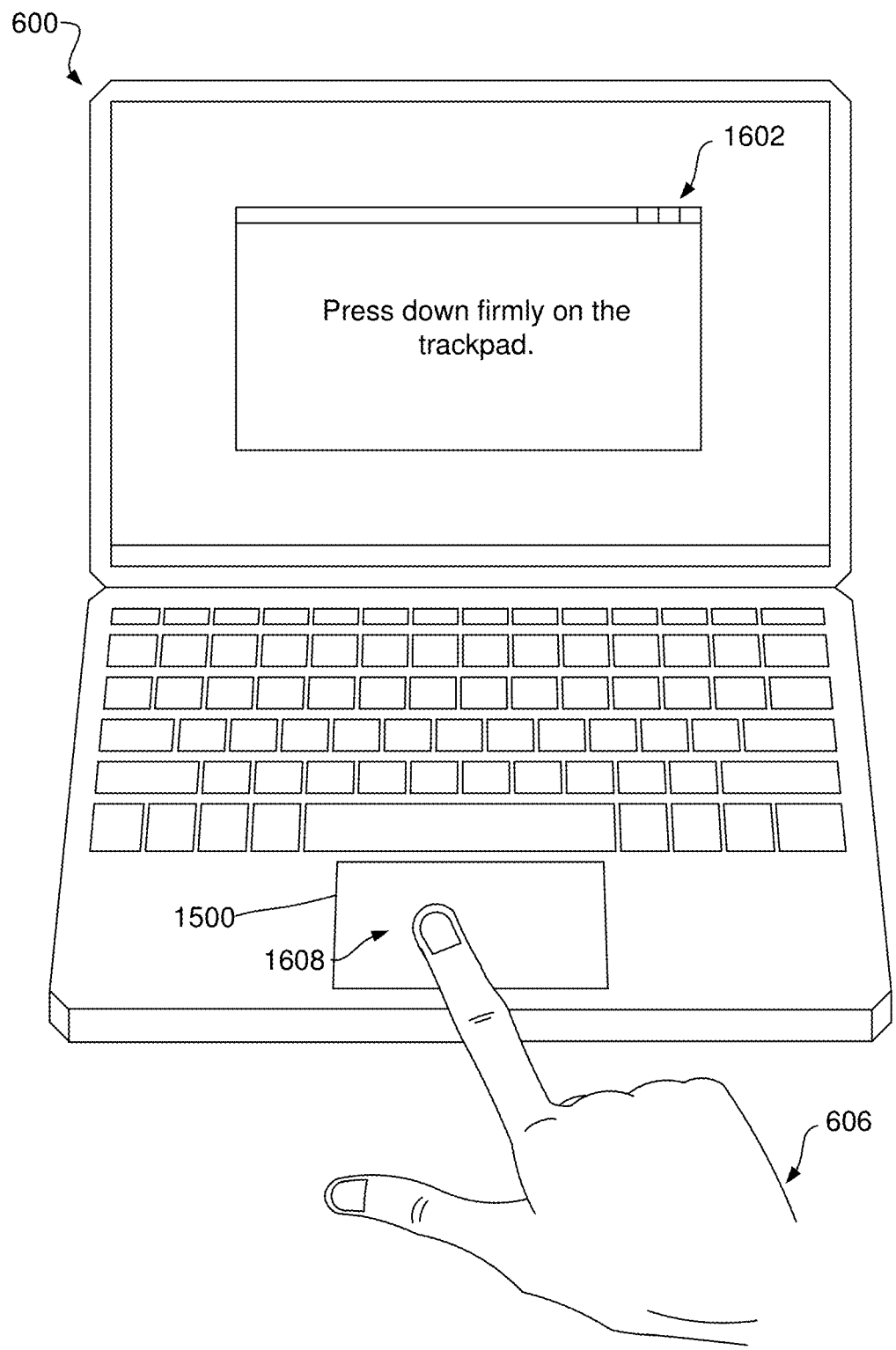
FIG. 16 depicts an example of an electronic device in accordance with the disclosure.

FIG. 16 depicts the electronic device 600 displaying a prompt 1602 for the user 606 to press down firmly on the capacitance module 1500. As the user 606 provides a firm press input 1608 on the capacitance module 1500, pressure sensors within the capacitance module 1500 may measure the applied pressure of the input. The pressure signal captured during this interaction may be stored as a pressure attribute corresponding to the user 606 as part of the user's profile, along with other user attributes.

Figure 17A:
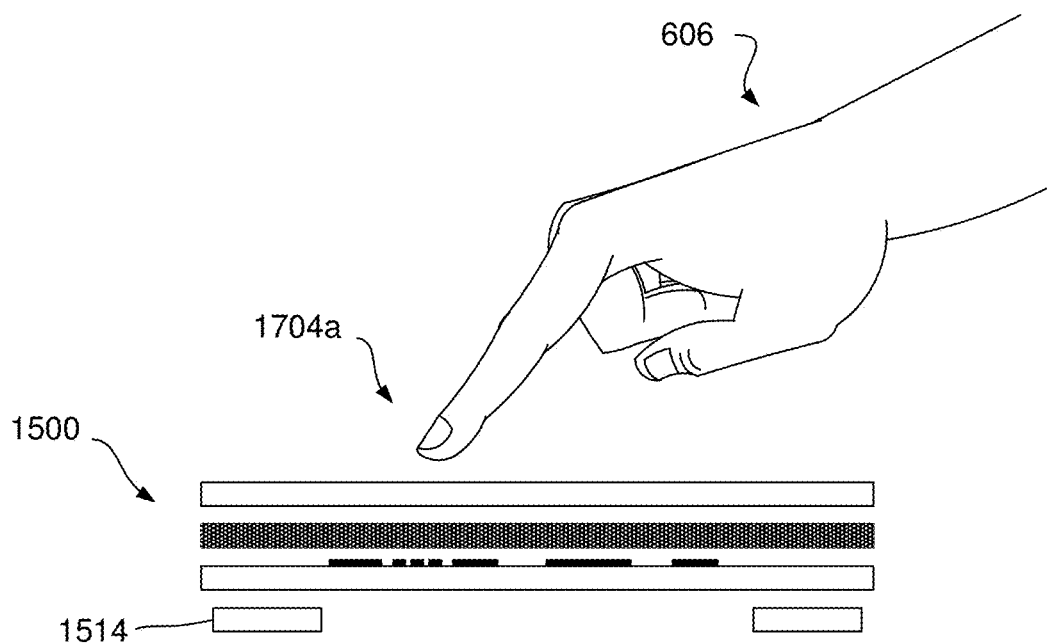
FIG. 17a depicts an example of a user input in accordance with the disclosure.
Figure 17B:
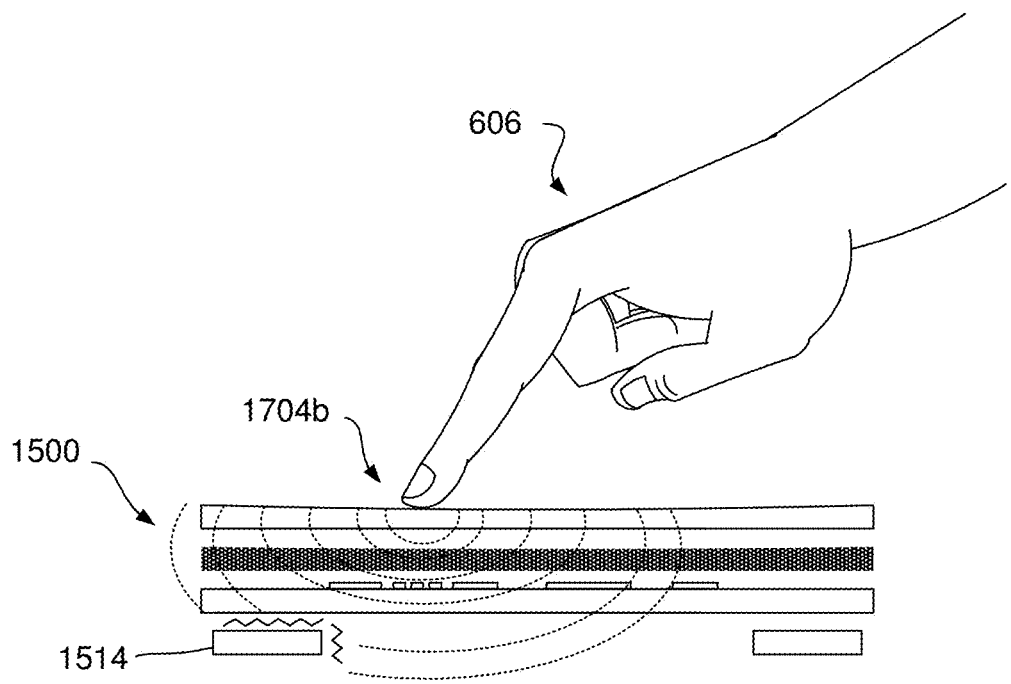
FIG. 17b depicts an example of a user input in accordance with the disclosure.

FIG. 17*a* and FIG. 17*b* depict an example of a pressure input from the user 606. In FIG. 17*a*, the user's 606 is positioned above the reference surface of the capacitance module 1500, ready to initiate the press input 1704*a*. At this stage, the pressure sensors 1514 are in their default state, awaiting the application of force.

As the user 606 performs the firm press input 1704*b* depicted in FIG. 17*b*, the pressure sensors 1514 may capture the resulting pressure signal. When the user's 606 finger comes into contact with the reference surface of the capacitance module 1500 and applies a downward force, the module may undergo a slight deformation. This deformation may be detected by the pressure sensors 1514, which convert the mechanical stress into electrical signals proportional to the applied deformation.

The pressure sensors 1514 may be strategically positioned to capture the spatial distribution of pressure across the capacitance module's 1500 reference surface. This may allow the system to record not only the overall magnitude of the applied pressure but also its localization and any symmetries in the pressure profile.

By measuring the pressure signal at multiple points and analyzing its temporal properties, the system may extract valuable information about the user's 606 pressing style.

Some users may apply pressure more gradually, while others may have a more rapid and forceful press. The peak pressure, the duration of the press, and the rate of change of pressure may all serve as pressure attributes for user identification.

A pressure attribute captured during a firm press input, along with other user attributes, may contribute to a user's identification profile. When a new input is detected, the system may compare the attributes of the new input to the stored user attributes and determine the most likely user based on the similarity between the inputs.

Incorporating pressure sensing into a capacitance module may enhance the system's ability to differentiate between users, as pressure information provides an additional dimension of input characteristics that can be leveraged for accurate user identification.

In some cases, a capacitance module may detect and record pressure attributes without the use of additional pressure sensors. In such an example, the capacitance modules may analyze the capacitance signal to determine whether the user is applying a press input and what the characteristic of the press input are.

Figure 18:
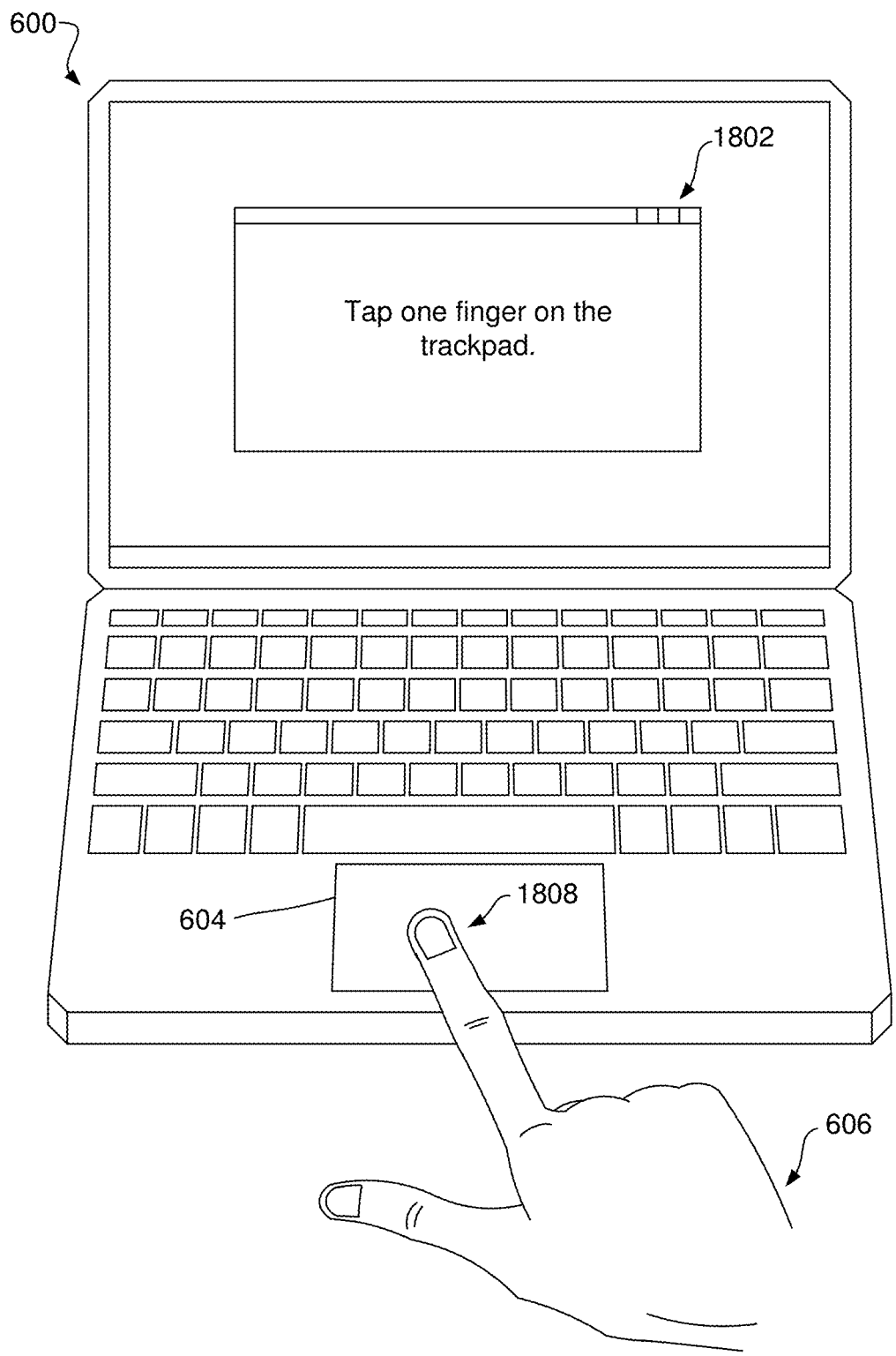
FIG. 18 depicts an example of an electronic device in accordance with the disclosure.

FIG. 18 depicts the electronic device 600 displaying a prompt 1802 for the user 606 to perform a tap input 1808 on the input device 604. A tap input may refer to a quick, light touch on the surface of a capacitance module, as opposed to a firm press or a prolonged contact.

As the user performs the tap input 1808, the capacitance module of the input device 604 may measure the resulting capacitive signal. The tap input 1808 may generate a distinct pattern on capacitance change over time, characterized by a rapid increase in capacitance as the user's finger approaches the surface, followed by a quick decrease as the finger is lifted away. The tap input 1808 may generate a distinct dimension of sensor excitement, such as a length or width of excited electrode regions on the capacitive sensors of the capacitance module. These capacitance attributes and dimension attributes may be stored as part of the user's 606 user input profile and used for user identification during normal operation of the capacitance module.

FIGS. 19*a*, 19*b*, 19*c*, 20*a*, 20*b*, 20*c*, 21*a*, and 21*b* collectively depict the process of capturing and comparing user attributes associated with tap inputs from one or more users.

Figure 19A:
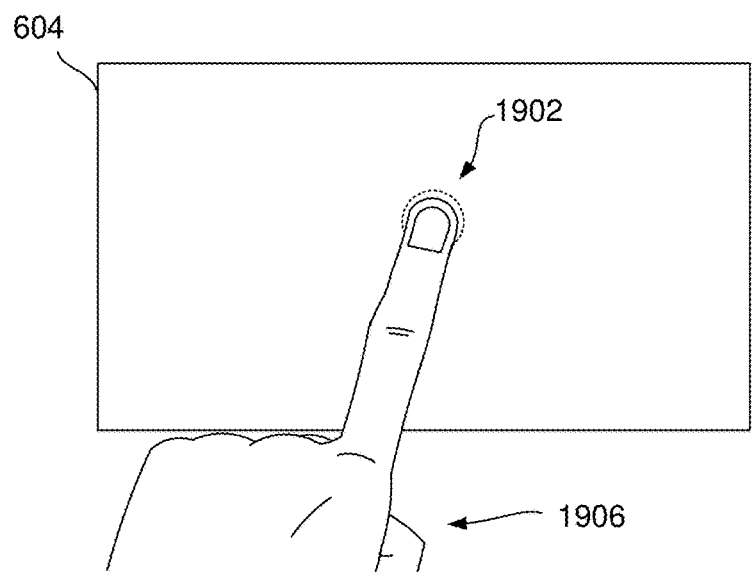
FIG. 19a depicts an example of a user input in accordance with the disclosure.

In FIG. 19*a*, a user 1906 is depicted performing a tap input 1902 on the capacitance module 604. As the user's 1906 finger makes contact with the reference surface of the module 604, the module may detect the presence and extent of the touch input.

Figure 19B:
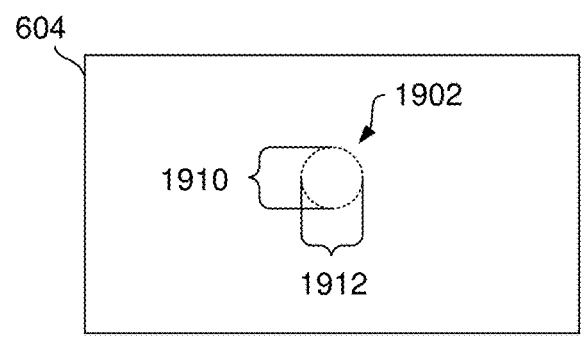
FIG. 19b depicts an example of a user input in accordance with the disclosure.

FIG. 19*b* depicts the spatial characteristics of the tap input 1902, including the input length 1910 and input width 1912. These spatial characteristics may offer insights into the size and shape of the user's 1906 finger or the contact area during the tap input 1902 and stored as dimension attributes for use during user identification.

Figure 19C:
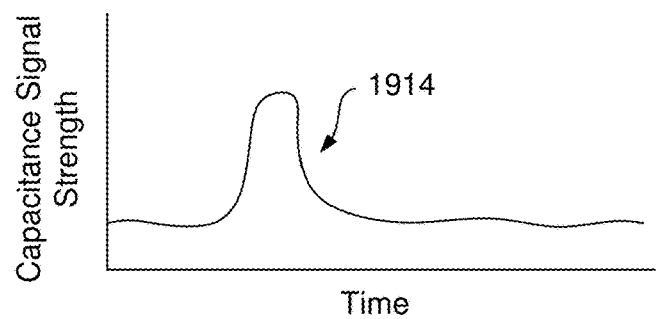
FIG. 19c depicts an example of a user input in accordance with the disclosure.

FIG. 19*c* depicts the temporal characteristics of the tap input 1902. A capacitance signal 1914 is plotted verses time. The signal 1914 may represent the change in capacitance measured by the sensors as the user's 1906 finger approaches, touches, and then lifts away from the reference surface. The shape of the signal 1914, including its peak amplitude, rise time, and fall time, may provide valuable information about the user's tapping dynamics.

Figure 20A:
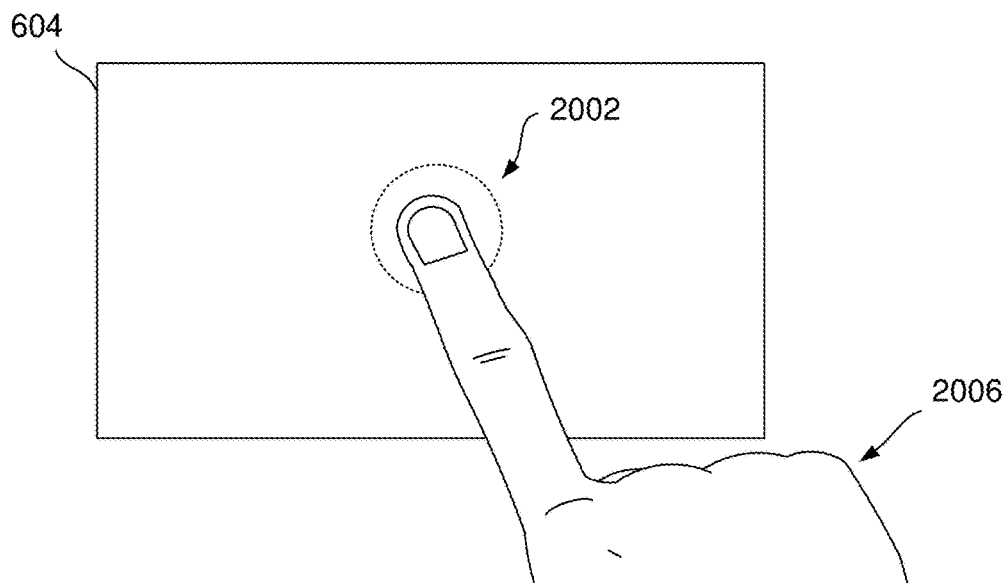
FIG. 20a depicts an example of a user input in accordance with the disclosure.
Figure 20B:
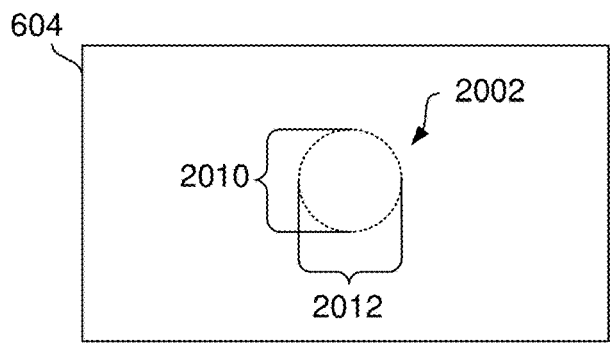
FIG. 20b depicts an example of a user input in accordance with the disclosure.
Figure 20C:
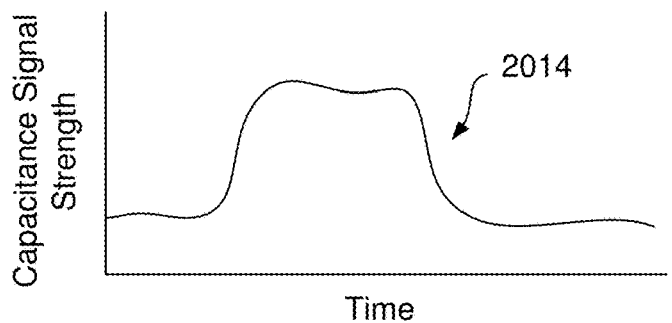
FIG. 20c depicts an example of a user input in accordance with the disclosure.

Similarly, FIG. 20*a* shows another user 2006 performing a tap input 2002 on the capacitance module 604. FIG. 20*b* depicts the input length 2010 and input width 2012 of the tap input 2002, and FIG. 20*c* depicts the corresponding capacitance signal 2014 over time.

Figure 21A:
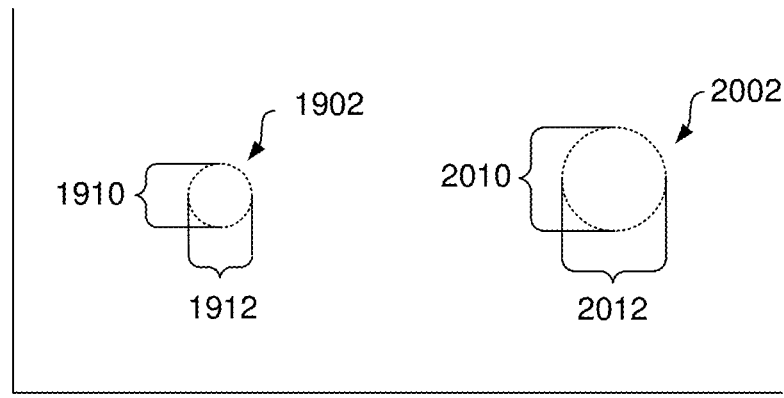
FIG. 21a depicts an example of user inputs in accordance with the disclosure.

FIG. 21*a* depicts a comparison between the spatial characteristics of the tap input 1902 and tap input 2002. The dimensions of each tap input are compared, highlighting the differences in the input lengths 1910, 2010, and input widths 1912, 2012. The spatial characteristics of user input by different users may vary based on the variations in finger size, input pressure, and user tendency between users.

Figure 21B:
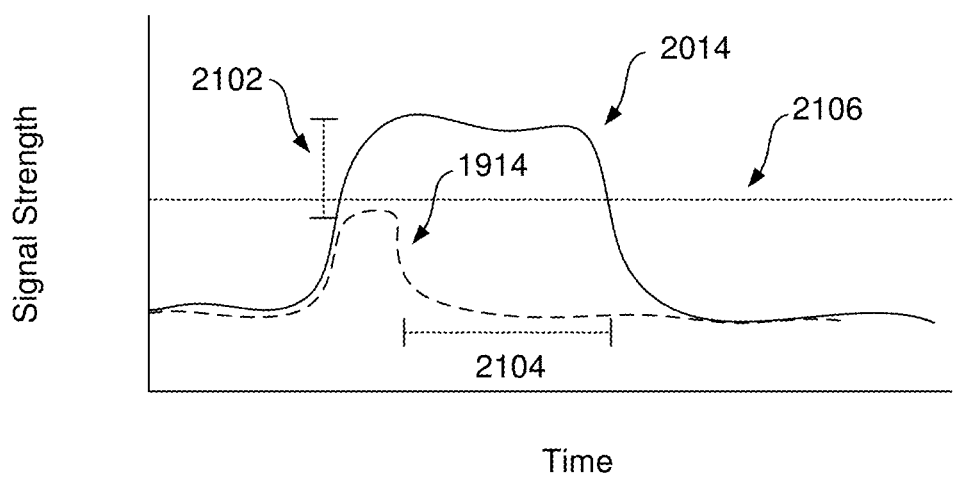
FIG. 21b depicts an example of user inputs in accordance with the disclosure.

FIG. 21*b* depicts a comparison between the temporal characteristics of the tap input 1902 and the tap input 2002. The capacitance signals 1914 and 2014 are plotted over time. A peak amplitude difference 2102 represents the difference in the maximum capacitance values reached by each user's tap input. The amplitude difference 2102 may be indicative of the pressure applied during the tap or proximity of the finger to the sensor surface. A temporal duration difference 2104 represents the variation in the time taken by each user's tap input from the moment of contact to the moment of release. Some users may have a faster, more abrupt tap, while others may exhibit a slower, more gradual touch.

By analyzing these dimension attributes and capacitance attributes, the system may build unique profiles for each user based on their specific input behaviors. The length, width, amplitude, and duration of the tap may serve as distinguishing features that can be used to differentiate between users.

During normal operation of a capacitance module, the system may detect a new input and extract its dimension attributes and capacitance attributes, comparing them to stored user profiles. By finding the closest match or by using machine learning algorithms trained on these attributes, the system may determine the most likely user responsible for the new input.

The comparison depicted in FIGS. 21*a* and 21*b* depict spatial and temporal aspects of tap inputs for accurate user identification. By leveraging the differences in touch size, shape, pressure, and timing, a capacitance module may create a robust and reliable system for distinguishing between users based on their unique input patterns.

Figure 22:
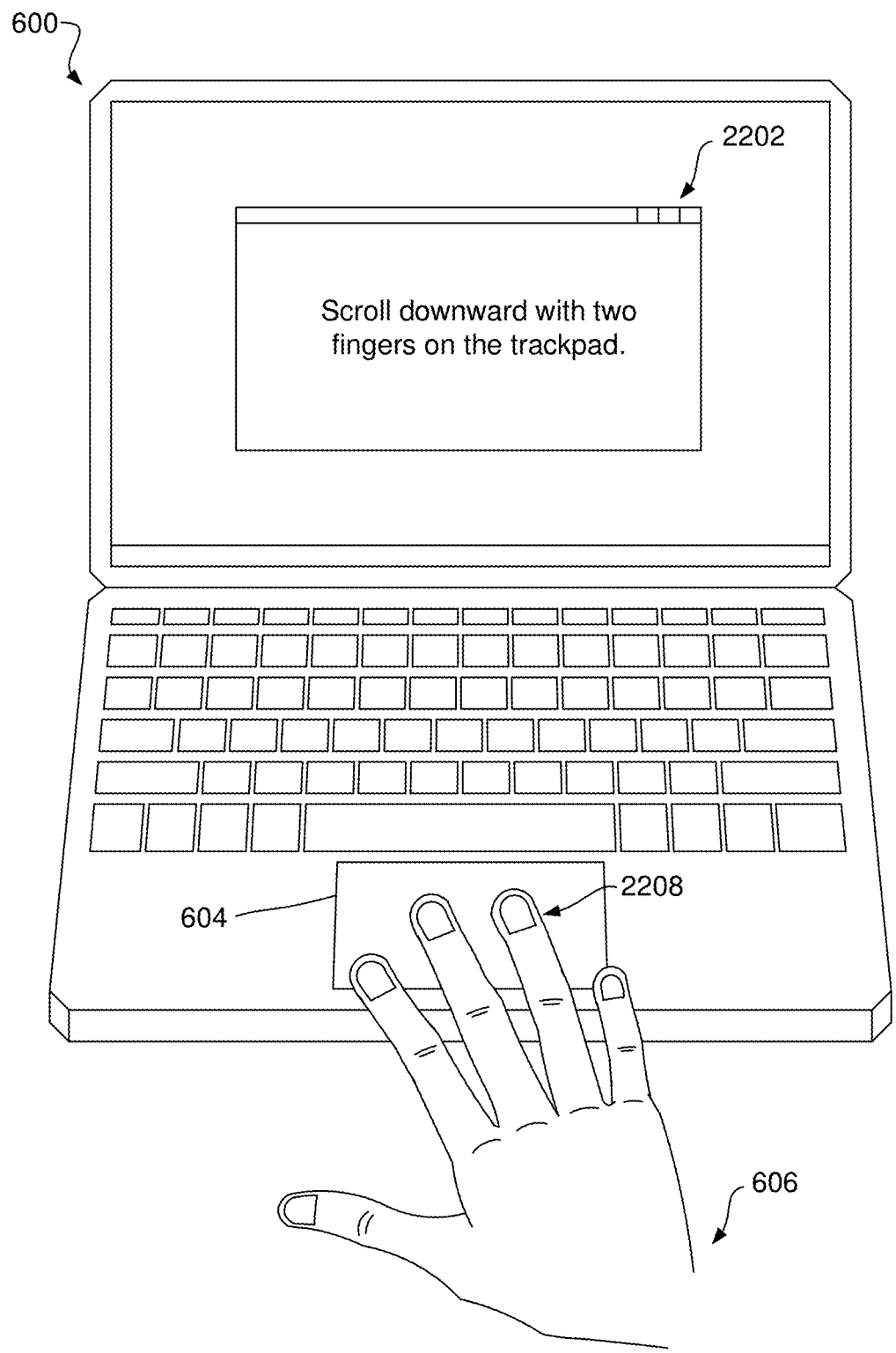
FIG. 22 depicts an example of an electronic device in accordance with the disclosure.

FIG. 22 depicts the computer 600 displaying a prompt 2202 for the user 606 to perform a swipe gesture with two fingers on the input device 604. As the user 606 provides the multi-touch input 2208, the system may capture and store a multi-touch attribute of the input for use in user identification.

Figure 23:
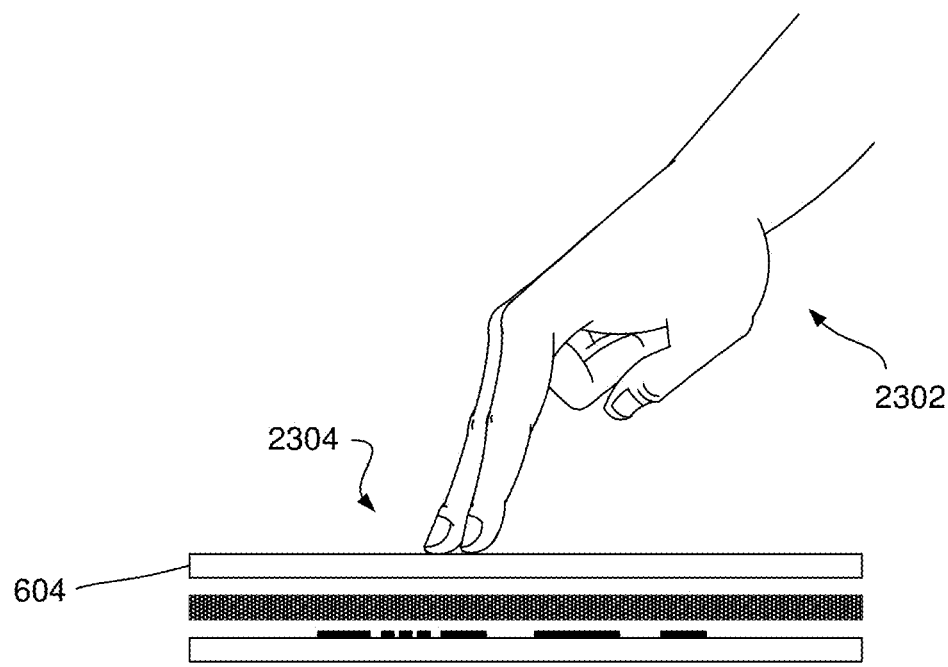
FIG. 23 depicts an example of a user input in accordance with the disclosure.
Figure 24:
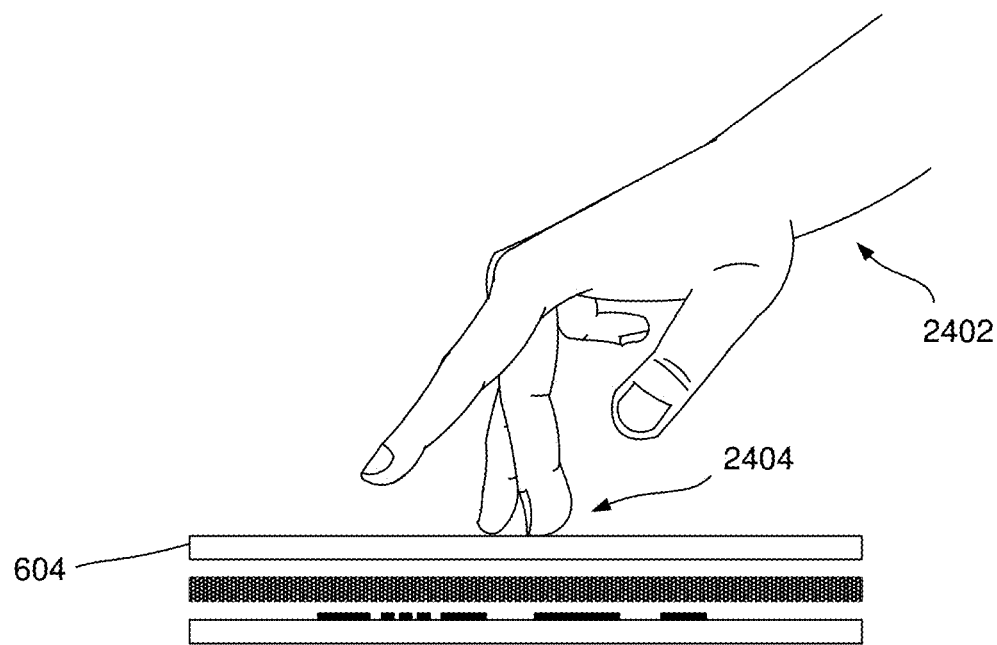
FIG. 24 depicts an example of a user input in accordance with the disclosure.

FIGS. 23 and 24 depict how different users may provide multi-touch inputs in different ways. In FIG. 23, a user 2302 places their middle and index fingers on the reference surface of the capacitance module 604 to perform a multi-touch gesture 2304. In FIG. 24, a user 2402 uses their middle and ring fingers to perform a multi-touch gesture 2404. These variations in finger placement and combinations highlight the idiosyncratic nature of multi-touch interactions among users.

Figure 25A:
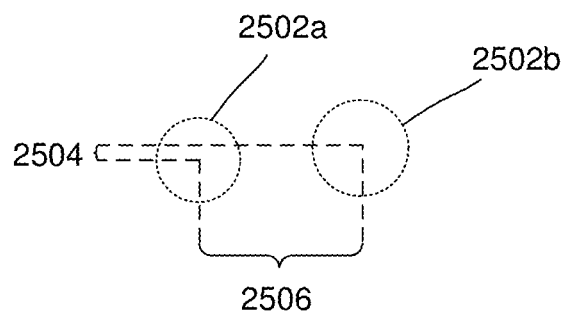
FIG. 25a depicts an example of a user input in accordance with the disclosure.
Figure 25B:
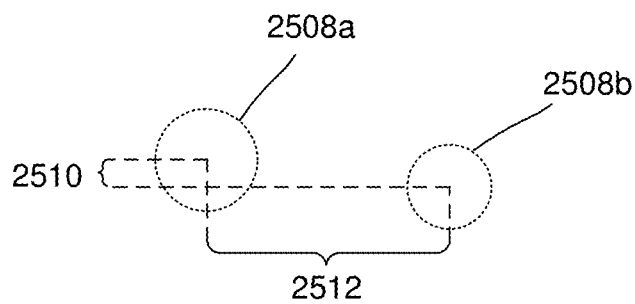
FIG. 25b depicts an example of a user input in accordance with the disclosure.

FIGS. 25*a* and 25*b* depict measurements of multi-touch gesture inputs. In FIG. 25*a*, two distinct finger signals 2502*a* and 2502*b* are detected, which may correspond to a user's middle and index fingers. The size difference between the two signals 2502*a* and 2502*b* may suggest that the user applies different levels of pressure or has fingers of varying sizes.

A vertical offset 2504 and horizontal offset 2506 between the center points of each finger signal 2502*a* and 2502*b* may provide insights into the user's hand geometry and finger placement habits. These spatial characteristics may be highly distinctive and consistent for each user.

Similarly, FIG. 25*b* depicts another multi-touch input with finger signals 2508*a* and 2508*b*. In this example, a vertical offset 2510 and horizontal offset 2512 between the center points of these signals 2508*a* and 2508*b* exhibit a different pattern compared to the offsets 2408*a* and 2408*b* depicted in FIG. 25*a*, indicating a distinct multi-touch attribute for this user.

A multi-touch attribute may encompass a wide range of characteristics, including the number of fingers used, the relative positions and orientations of the fingers, the pressure applied by each finger, the timing and synchronization of the finger movements, and the overall hand postured during the interaction. These attributes may arise from a combination of anatomical factors, motor skills, and individual preferences, making them highly personalized and potentially effective for user identification.

Variability in multi-touch attributes among users may be attributed to hand size and finger dimensions. Users with larger hands or longer fingers may exhibit different multi-touch patterns compared to those with smaller hands or shorter fingers. Variability may also be attributed to hand dominance and dexterity. The dominant hand and the user's level of manual dexterity may influence the precision, speed, and consistency of multi-touch inputs. Variability may further be attributed to interaction habits and preferences. Users may have developed specific habits or preferences for multi-touch interactions based on their experience with various devices and applications. Variability may yet be further attributed to cultural and ergonomic factors. The way users hold and interact with devices may be influenced by cultural norms, ergonomic considerations, and personal comfort.

By leveraging variations in multi-touch attributes, a user identification system may create unique profiles for each user. During a calibration process, a capacitance module may prompt users to perform specific multi-touch gestures and record the resulting attribute data. This data may then be analyzed to extract distinctive features and patterns that can serve as user's input signature.

Figure 26:
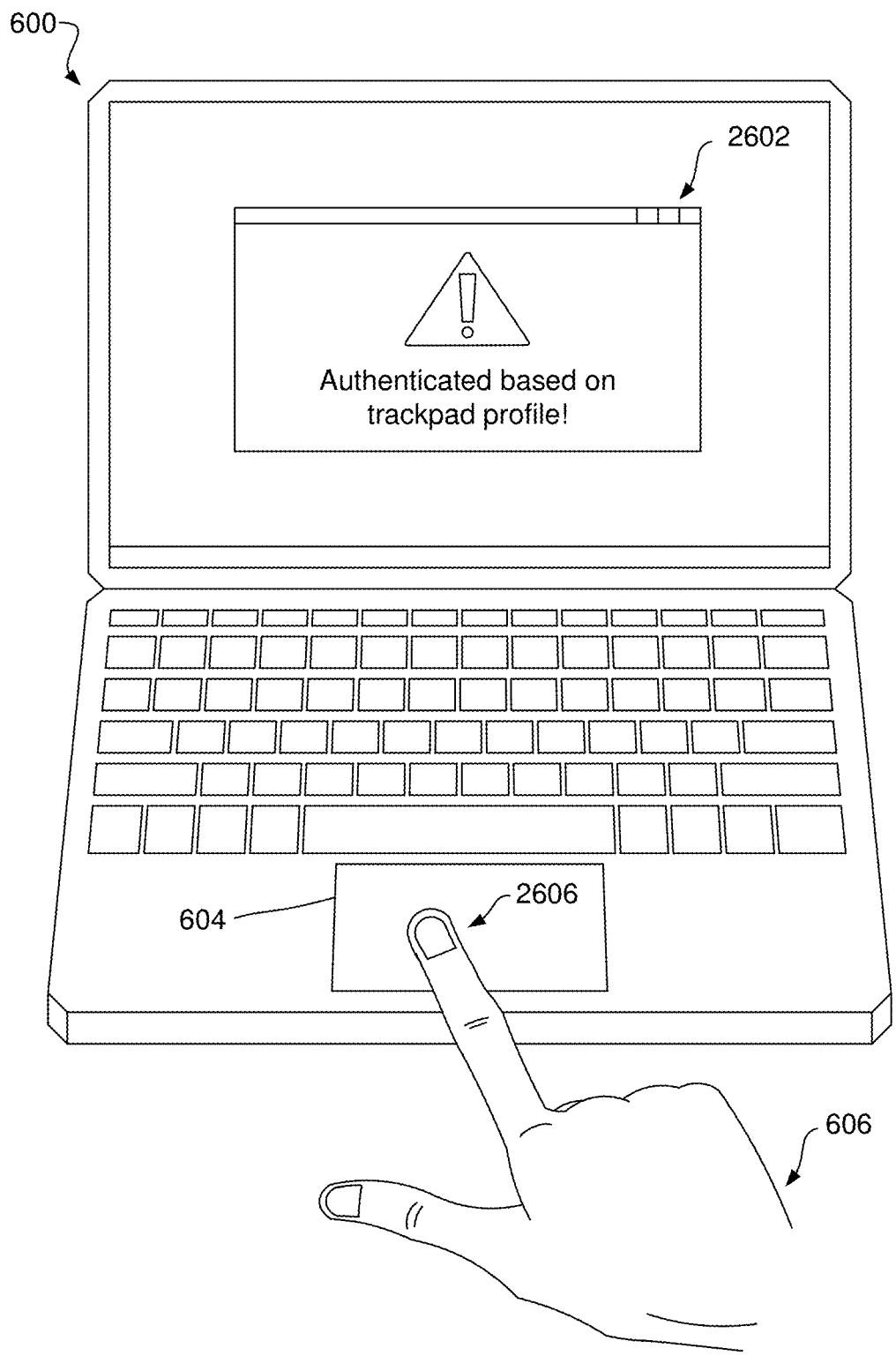
FIG. 26 depicts an example of an electronic device in accordance with the disclosure.

FIG. 26 depicts the electronic device 600 displaying an alert 2602 indicating that the user 606 has been authenticated based on an analysis of their input 2606 on the input device 604. In some cases, once a user has been positively identified by a capacitance module based on their input user attributes, the capacitance module may authenticate a user or access to some restricted function or data of an electronic device.

In the context of user authentication, a capacitance module may continuously monitor the attributes of user input, such as capacitance attributes, pressure attributes, image attributes, typing attributes, other user attributes, or combinations thereof. By comparing the attributes of an input to the attributes contained in stored user profiles, the system may determine the identity of the user interacting the device.

When the system successfully matches the input attributes to a specific user profile, it may automatically authenticate the user and grant access to personalized settings, restricted applications, or sensitive data associated with that user's account. This seamless authentication process may eliminate the need for traditional login methods, such as passwords or personal identification numbers (PINs), enhancing the user experience and reducing friction.

The decision to display an authentication alert, like the alert 2602 depicted in FIG. 26, may depend on the specific use case and the level of required security. In some instances, a system may grant access to certain functions or data without explicitly notifying the user. This approach may be suitable for low-risk or frequently accessed features, such as personalized app preferences or non-sensitive device settings.

For example, if the user identification system detects that the current user is the primary owner of a device, it may automatically apply their preferred system settings, such has display brightness, audio volume, or keyboard layout, without displaying any alerts. This seamless adaptation may enhance the user experience by providing a tailored environment without interrupting the user's workflow.

Conversely, for more sensitive or critical operations, such as accessing confidential documents, making financial transactions, or performing system-level changes, the system may require explicit user confirmation and display a prominent authentication alert. In these cases, the alert may serve as a security measure, informing the user that their identity has been verified and that they are authorized to proceed with the restricted action. An authentication alert may include additional information, such as the user's name, profile picture, or a summary of the accessed functionality in order to provide clarity to the user.

In some scenarios, a user identification system may be used in conjunction with other authentication methods, such as biometric recognition or two-factor authentication to provide an even higher level of security. For example, after successfully identifying the user based on their input attributes, the system may prompt the user to provide a fingerprint scan or enter a one-time password to confirm their identity before granting access to highly sensitive information.

In some cases, a user identification system may continuously monitor the user's input patterns throughout their interaction with the device. If the system detects a significant deviation from the user's typical behavior or suspects an unauthorized user, it may prompt for re-authentication or perform other security measures to prevent security breaches.

Figure 27:
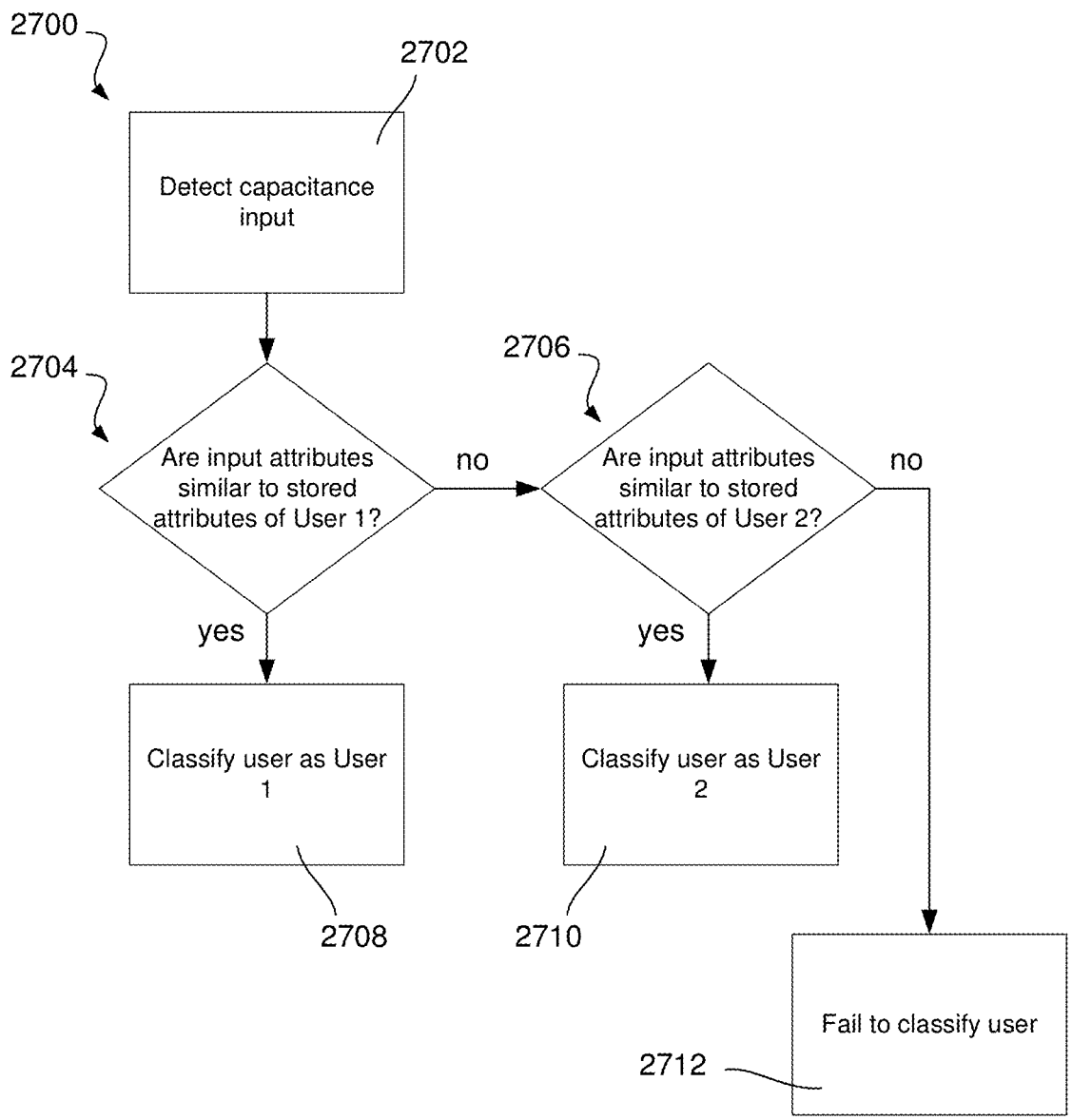
FIG. 27 depicts an example of a method for identifying a user in accordance with the disclosure.

FIG. 27 depicts an example of a method 2700 for identifying a user identity with a capacitance module. This method 2700 may be performed based on the description of the devices, modules, and principles described in relation to FIGS. 1-26. During operation, the capacitance module may detect 2702 a capacitance input. The capacitance module may make a first determination 2704 if the input attributes of the capacitance input are similar to stored user attributes of a first user. If the input attributes are similar to the stored user attributes of the first user, the capacitance module may identify 2708 the user as the first user. If the input attributes are not similar to the stored user attributes of the first user, the capacitance module may make a second determination 2706 if the input attributes are similar to stored user attributes of a second user. If the input attributes are similar to the stored user attributes of the second user, the capacitance module may identify 2710 the user as the second user. If the input attributes are not similar to the stored user attributes of the second user, the capacitance module may fail 2712 to identify the user. In other examples, the system may perform another operation if the input attributes are not similar to the stored user attributes of the first or second user.

Figure 28:
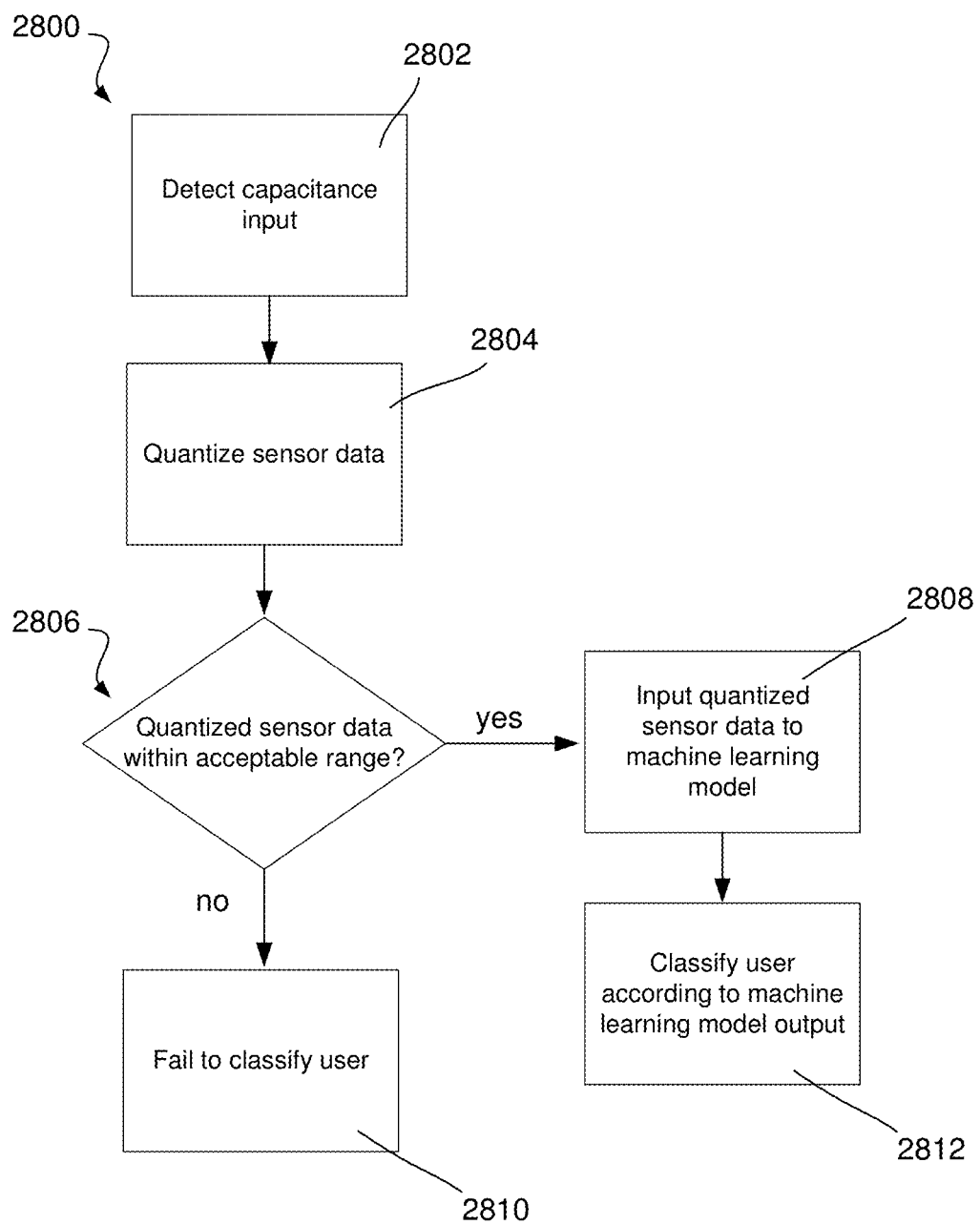
FIG. 28 depicts an example of a method for identifying a user in accordance with the disclosure.

FIG. 28 depicts a method for identifying a user identity with a capacitance module. This method may be performed based on the description of the devices, modules, and principles described in relation to FIGS. 1-26. During operation, the capacitance module may detect 2802 a capacitance input. The capacitance module may quantize 2804 the sensor data of the input. The capacitance module may make a first determination 2806 if the quantized sensor data is within an acceptable range. If the quantized sensor data is not within an acceptable range, the capacitance module may fail 2810 to identify a user. In some examples, the system may perform another operation if the quantized sensor data is not within an acceptable range. If the quantized sensor data is within an acceptable range, the capacitance module may input 2808 the quantized sensor data to a machine learning model. The capacitance module may identify 2812 a user identity according to the output of the machine learning model.

During a calibration stage, the system may prompt a user to perform specific input gestures such as swipes, taps, and multi-touch interactions on the capacitance module. The resulting input data, including user attributes, may be captured and used to train a supervised machine learning model, such as a support vector machine (SVM), random forest, neural network, or another type of machine learning model.

The trained machine learning model may learn to recognize the unique input patterns and characteristics associated with a user, creating a robust and discriminative user identification profile. When a new input is detected during normal operation, the system may extract relevant attributes of the input and feed them into the trained model. The model may then predict the most likely user identity based on the learned patterns and associations.

A machine learning model may be updated and fine-tuned during normal operation. As users interact with the device, their input data may be continuously collected and analyzed. This new data may be used to retrain the model periodically, allowing it to adapt to changes in user behavior or input patterns over time.

In some cases, machine learning models may be trained or updated through unsupervised machine learning techniques, such as clustering algorithms. The system may cluster input data based on similarities in attributes and compare the resulting clusters to existing user profiles. In cases where a cluster significantly deviates from known user profiles, it may indicate the presence of a new user or a significant change in a user's input behavior. The system may then prompt for user confirmation and update the corresponding user profile accordingly.

In some instances, deep learning may be particularly valuable for user identification tasks due to its ability to automatically learn hierarchical representations and extract complex patterns from large amounts of data. Deep neural networks, such as convolutional neural networks or recurrent neural networks may be employed to process the high-dimensional and time-series data generated by user inputs on the capacitance module.

One advantage of deep learning may be in its capacity to discover intricate relationships and dependencies among various user attributes without the need for extensive manual feature engineering. By training deep neural networks on the vast amount of user input data, the system may learn to recognize subtle nuances and variations in user behavior that may be difficult to capture using traditional machine learning techniques. This enhanced ability to analyze and interpret complex input patterns may lead to improved accuracy and robustness in user identification.

Another advantage of deep learning models may be its ability to manage multi-modal input data, such as combining capacitance attributes, pressure attributes, and spatial attributes to enable a more comprehensive understanding of user behavior. The hierarchical nature of deep neural networks may allow them to learn representations at different levels of abstraction, from low-level features like capacitance profiles to high-level concepts like user-specific interaction patterns.

By combining supervised and unsupervised machine learning approaches, the user identification system may benefit from both the discriminative power of labeled data and the ability to discover new patterns and adapt to evolving user behavior. The integration of deep learning techniques may further enhance the system's capacity to manage the complexity and richness of user input data, enabling more accurate and robust user identification.

Figure 29:
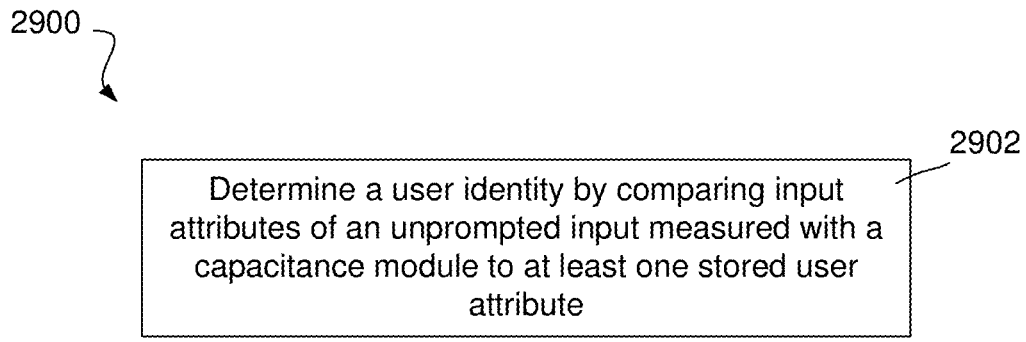
FIG. 29 depicts an example of a method for identifying a user in accordance with the disclosure.

FIG. 29 depicts an example of a method 2900 for determining a user identity with a capacitance module. This method 2900 may be performed based on the description of the devices, modules, and principles described in relation to FIGS. 1-26. A capacitance module may determine 2902 a user identity by comparing input attributes of an unprompted input measured with the capacitance module to at least one stored user attribute.

Figure 30:
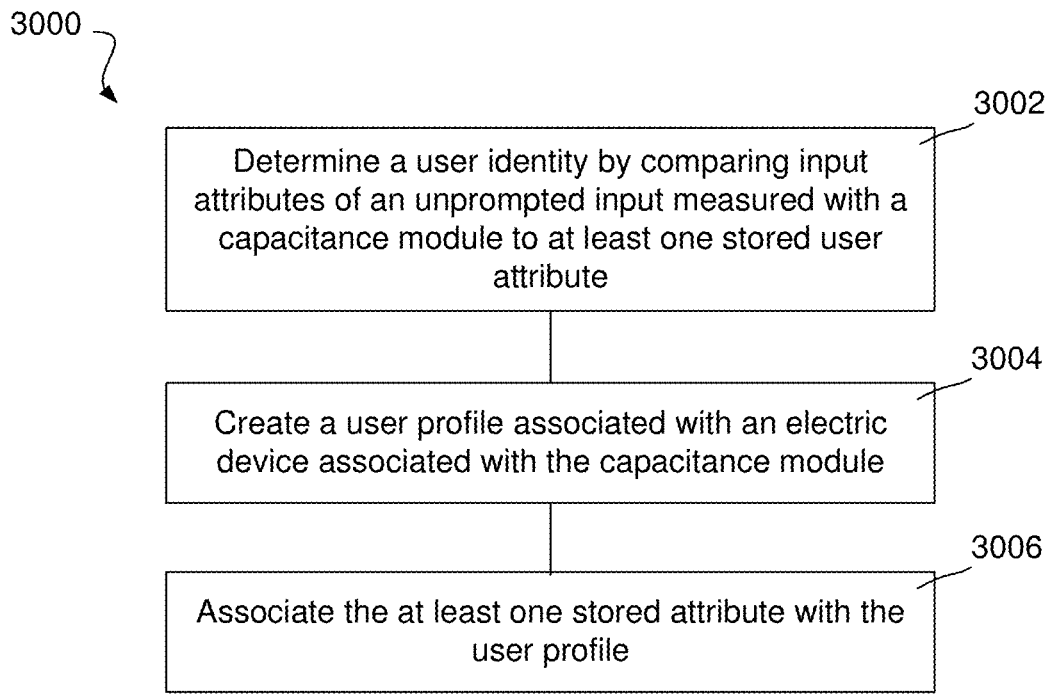
FIG. 30 depicts an example of a method for identifying a user in accordance with the disclosure.

FIG. 30 depicts an example of a method 3000 for determining a user identity with a capacitance module. This method 3000 may be performed based on the description of the devices, modules, and principles described in relation to FIGS. 1-26. A capacitance module may determine 3002 a user identity by comparing input attributes of an unprompted input measured with the capacitance module to at least one stored user attribute. The capacitance module may create 3004 a user profile associated with an electric device associated with the capacitance module. The capacitance module may associate 3006 the at least one stored attribute with the user profile.

Figure 31:
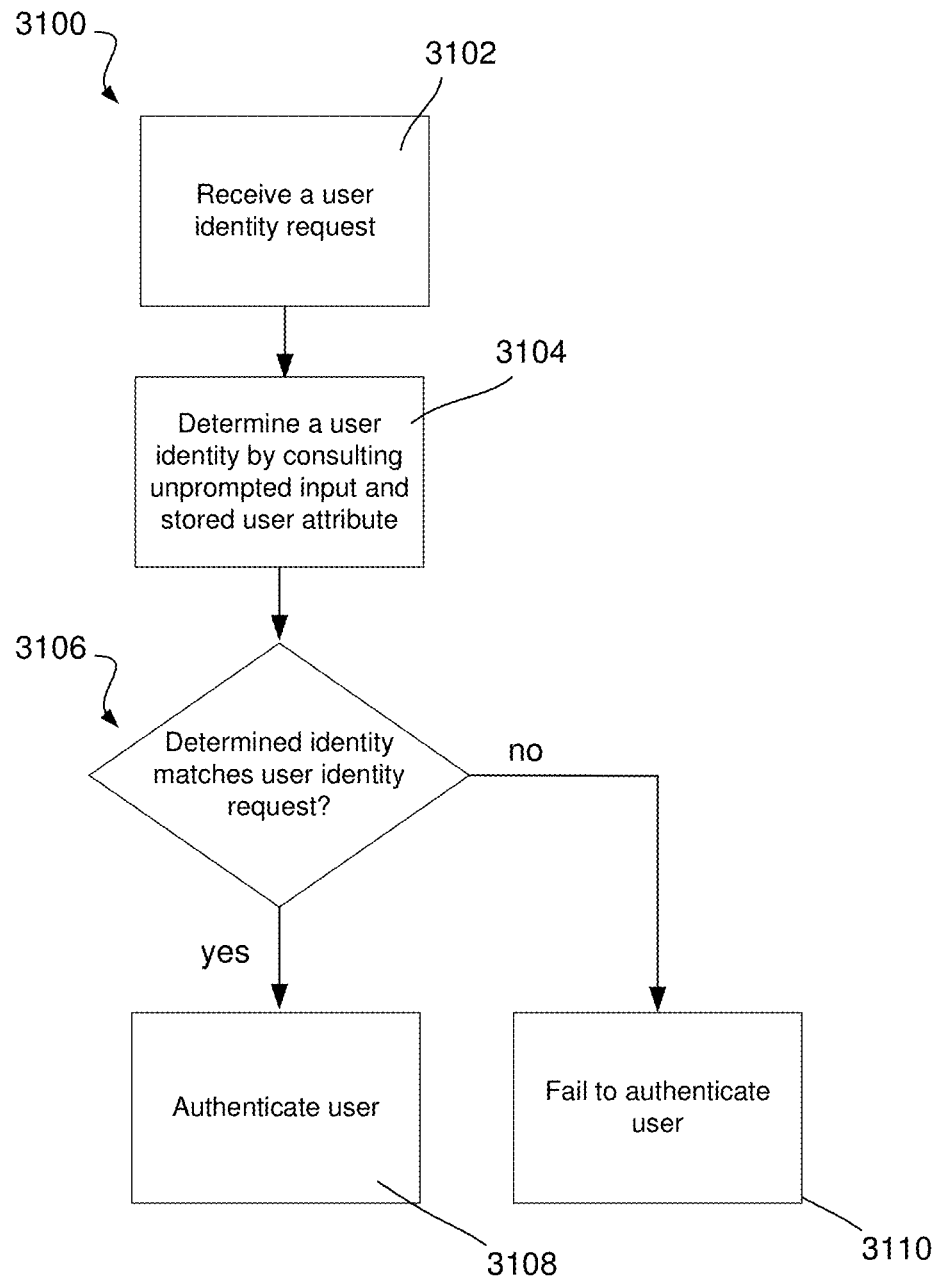
FIG. 31 depicts an example of a method for authenticating a user in accordance with the disclosure.

FIG. 31 depicts an example of a method 3100 for authenticating a user with a capacitance module. This method 3100 may be performed based on the description of the devices, modules, and principles described in relation to FIGS. 1-26. A capacitance module may receive 3102 a user identity request. The capacitance module may determine 3104 a user identity by consulting an unprompted input and a stored user attribute. The capacitance module may make a determination 3106 whether the determined identity matches the user identity request. If the determined identity matches the user identity request, the capacitance module may authenticate 3108 the user; if not, the capacitance module may fail 3110 to authenticate the user. In other examples, a capacitance module may perform another operation if the determined user identity does not match the user identity request.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

The invention claimed is:

1. A capacitance module, comprising:
a set of electrodes;
a processor in communication with the set of electrodes;
memory in communication with the processor;
wherein the memory includes programmed instructions that cause the capacitance module, when executed, to:
determine a user identity by comparing input attributes of an unprompted input with at least one user attribute stored in the memory;
wherein the input attributes of the unprompted input and the at least one user attribute stored in memory does not include a fingerprint attribute.

2. The capacitance module of claim 1, wherein the at least one stored attribute includes a speed attribute.

3. The capacitance module of claim 1, wherein the at least one stored attribute includes a movement attribute.

4. The capacitance module of claim 1, wherein the at least one stored attribute includes a gesture endpoint attribute.

5. The capacitance module of claim 1, wherein the at least one stored attribute includes a pressure attribute.

6. The capacitance module of claim 1, wherein the at least one stored attribute includes a capacitance attribute.

7. The capacitance module of claim 1, wherein the at least one stored attribute includes a multi-touch attribute.

8. The capacitance module of claim 1, wherein the at least one stored attribute includes a typing attribute.

9. The capacitance module of claim 1, wherein the programmed instructions further cause the processor to:
create a user profile; and
associate the at least one stored attribute with the user profile.

10. The capacitance module of claim 9, wherein the user profile is created through a machine learning process.

11. The capacitance module of claim 1, wherein the at least one stored user attribute is determined through a calibration process.

12. The capacitance module of claim 1, wherein the at least one stored user attribute is updated through a machine learning process.

13. The capacitance module of claim 1, wherein the programmed instructions further cause the processor to:
receive a user identity request associated with an unprompted input;
determine a user identity for the unprompted input by consulting the stored user attribute; and
authenticate the user identity request if the determined user identity matches the user identity request.

14. The capacitance module of claim 13, wherein authenticating the user identity request includes granting access to a restricted function or data.

15. A method for determining an identity of a user, comprising:
determining a user identity by comparing input attributes of an unprompted input measured with a capacitance module to at least one stored user attribute;
wherein the input attributes of the unprompted input and the at least one user attribute stored in memory does not include a fingerprint attribute.

16. The method of claim 15, further comprising:
creating a user profile associated with an electric device associated with the capacitance module; and
associating the at least one stored attribute with the user profile.

17. A computer-program product for identifying a user of a capacitance module, the computer-program product comprising a non-transitory computer-readable medium storing instructions executable by a processor to:
determine a user identity by comparing input attributes of an unprompted input measured with a capacitance module to at least one stored user attribute;
wherein the input attributes of the unprompted input and the at least one user attribute stored in memory does not include a fingerprint attribute.

18. The computer-program product of claim 17, wherein the instructions are further executable by a processor to:
create a user profile associated with an electric device associated with the capacitance module; and
associate the at least one stored attribute with the user profile.

19. The computer-program product of claim 17, wherein the instructions are further executable by a processor to:
authenticate a user identity request based, at least in part, on the user identity.

20. The computer-program product of claim 17, wherein the instructions are further executable by a processor to:
grant access to a restricted function or data.

\* \* \* \* \*